United States Patent
Ikeda et al.

(10) Patent No.: US 7,630,539 B2
(45) Date of Patent: Dec. 8, 2009

(54) IMAGE PROCESSING APPARATUS

(75) Inventors: Yasuyuki Ikeda, Ayabe (JP); Shiro Fujieda, Kyoto (JP)

(73) Assignee: OMRON Corporation, Kyoto-Shi (JP)

( * ) Notice: Subject to any disclaimer, the term of this patent is extended or adjusted under 35 U.S.C. 154(b) by 761 days.

(21) Appl. No.: 11/454,120

(22) Filed: Jun. 16, 2006

(65) Prior Publication Data

US 2006/0291719 A1 Dec. 28, 2006

(30) Foreign Application Priority Data

Jun. 17, 2005 (JP) ............................ P2005-178540
Jun. 17, 2005 (JP) ............................ P2005-178546

(51) Int. Cl.
*G06K 9/00* (2006.01)
(52) U.S. Cl. ...................... 382/154; 382/141
(58) Field of Classification Search ................ 382/106, 382/141, 151, 154, 286, 287, 291; 345/419; 348/42, 47–50; 356/614
See application file for complete search history.

(56) References Cited

U.S. PATENT DOCUMENTS 5,850,352 A * 12/1998 Moezzi et al. .............. 345/419

7,009,690 B2 * 3/2006 Kamon et al. ................. 356/3
7,239,312 B2 * 7/2007 Urisaka et al. .............. 345/419
2007/0098251 A1 * 5/2007 Lu ............................. 382/154

FOREIGN PATENT DOCUMENTS

| JP | 2002-099902 | 4/2002 |
| JP | 2002-230549 | 8/2002 |
| JP | 2005-167678 | 6/2005 |

OTHER PUBLICATIONS

Miichi et al., "Calibration of Projector-Camera System," http://research.microsoft.com/zhang/Calib/, 8 pages.

* cited by examiner

*Primary Examiner*—Daniel G Mariam
(74) *Attorney, Agent, or Firm*—Foley & Lardner LLP

(57) ABSTRACT

Plural items of two-dimensional image processing and at least one item of a three-dimensional measurement process are registered in a processing item table. The items of two-dimensional image processing include at least one item of an on-first-image position specification process of specifying a position on a physical object in a first image. A sequence building unit combines the item of the on-first-image position specification process and the item of the three-dimensional measurement process to set the sequence for three-dimensional measurement by selection of a user.

17 Claims, 18 Drawing Sheets

Fig. 5

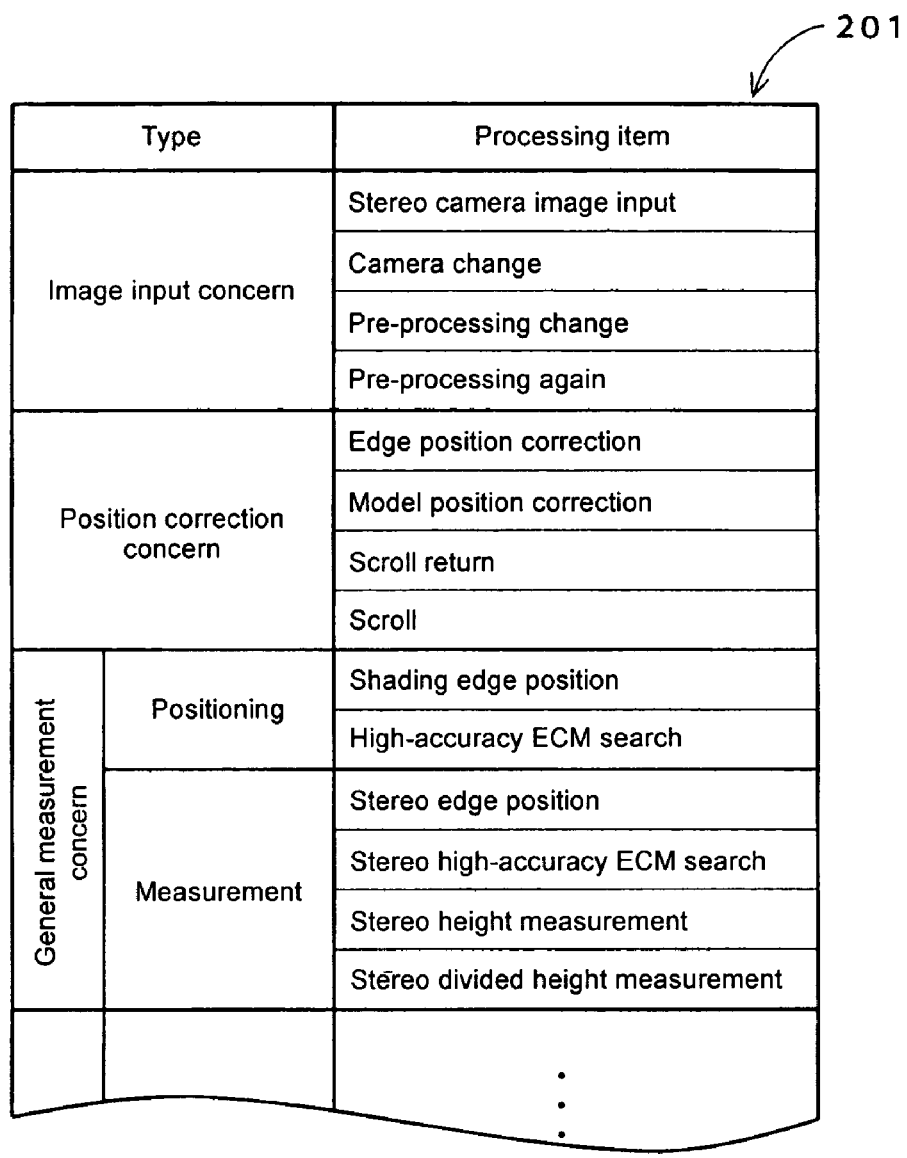

| Type | | Processing item |
|---|---|---|
| Image input concern | | Stereo camera image input |
| | | Camera change |
| | | Pre-processing change |
| | | Pre-processing again |
| Position correction concern | | Edge position correction |
| | | Model position correction |
| | | Scroll return |
| | | Scroll |
| General measurement concern | Positioning | Shading edge position |
| | | High-accuracy ECM search |
| | Measurement | Stereo edge position |
| | | Stereo high-accuracy ECM search |
| | | Stereo height measurement |
| | | Stereo divided height measurement |
| | | ⋮ |

Fig. 10

0. Edge position =Setting=

0. Stereo camera image input
1. Density average / deviation
2. Shading edge position
3. Camera change
4. Stereo edge position
5.

ENT: Set, SFT+ESC: Edit

Height range : 0 to 5

Height range : -15 to 15

IMAGE PROCESSING APPARATUS

This application claims priority from Japanese patent applications JP P2005-178540, filed on Jun. 17, 2005 and JP P2005-178546, filed on Jun. 17, 2005. The entire contents of the aforementioned applications are incorporated herein by reference.

BACKGROUND OF THE INVENTION

1. Field of the Invention

The present invention relates to an apparatus which performs a three-dimensional measurement based on images taken by plural cameras which are arranged so as to take a physical object from different directions.

2. Description of the Related Art

Conventionally, an apparatus which perform a measurement to a shape and a surface pattern of the physical object by two-dimensional image processing is widely used on various production sites. In this kind of two-dimensional image processing apparatus, the measurement is performed based on the image in which a representative surface (for example, a bottom surface of the physical object) of the physical object or a measurement target surface (including an inspection target surface) of the physical object is taken from a direction perpendicular to the surface, i.e., the direction in which the surface is viewed from a front side. In this case, the term "measurement" shall include a measurement for the purpose of inspection. In the following description, the term simply referred to as "measurement" shall include "measurement for the purpose of inspection" based on the fact that some sort of measurement is performed in an inspection process.

In order that the same apparatus can be applied to the various measurement purposes, almost all the pieces of two-dimensional image processing apparatus have menus of various processing items, and a user can build the sequence of the processing items by specifying the processing items to be used and an executing procedure. For example, FIG. 9 of Japanese Patent Application Laid-Open No. 2005-167678 shows an image processing apparatus, in which the available processing items are presented to a user to cause the user to specify the procedure of executing the processing item.

On the other hand, there is a well-known three-dimensional measurement technique based on a stereoscopic view principle with plural cameras. For example, Japanese Patent Application Laid-Open No. 2002-99902 discloses the three-dimensional measurement technique. However, in the current apparatus for the three-dimensional measurement, a kind and a characteristic of the physical object are restricted, and a measurement algorithm is included in order to utilize the given feature of the physical object to perform the measurement. Therefore, the apparatus is put into practical use as the apparatus dedicated to the physical object. For example, Japanese Patent Application Laid-Open No. 2002-99902 discloses an image processing apparatus which performs the three-dimensional measurement to the physical object having a rotationally symmetric shape.

If a three-dimensional measurement of a physical object is available on various production sites, a measurement which cannot be performed in a conventional two-dimensional image processing apparatus may be realized, and measurement accuracy and usability may be improved than ever before. However, currently there has been no known three-dimensional measurement apparatus which can be widely used on the various production sites.

The inventors do not develop the conventionally general image processing apparatus specializing in the three-dimensional measurement, but develop the apparatus in which the three-dimensional measurement function is added while the functions of the conventional two-dimensional image processing apparatus are inherited, and thereby the inventors intend to create the new type of image processing apparatus having high versatility in which the three-dimensional measurement can be performed. In view of the foregoing, a problem of the invention is to be able to specify the sequence of the three-dimensional measurement by a user interface in which the available processing items are presented to cause a user to produce the sequence of the processing items, like the conventional two-dimensional image processing apparatus.

Another problem of the invention is to utilize a part of the process used in the conventional two-dimensional image processing apparatus for the three-dimensional measurement.

SUMMARY OF THE INVENTION (1) An image processing apparatus of the invention which performs a process with a first image and a second image taken by a first camera and a second camera respectively, the first camera and the second camera being arranged so as to take a physical object from different directions, the image processing apparatus including sequence setting means for setting a sequence of a processing item; and sequence executing means for executing the set sequence, wherein the sequence setting means provides plural items of two-dimensional image processing and at least one item of a three-dimensional measurement process as the processing item which can be set at a sequence element by selection of a user, the provided items of the two-dimensional image processing include at least one item of an on-first-image position specification process of specifying a position on a physical object in the first image, and the three-dimensional measurement process includes an on-second-image position specification process of specifying a position on a physical object in the second image, the position on the physical object in the second image corresponding to the position on the physical object in the first image which is specified in the on-first-image position specification process belonging to the same sequence as the sequence to which the on-second-image position specification process belongs to.

In the image processing apparatus of the invention, the process of specifying the position on the first image for the three-dimensional measurement is adopted to be selected from the plural items of the two-dimensional image processing. Therefore, the image processing apparatus is highly compatible with the conventional two-dimensional image processing apparatus while the three-dimensional measurement can be performed, and a little amount of teaching is required when a user uses the image processing apparatus. Accordingly, the user can easily use the image processing apparatus.

At least three cameras may be used. In this case, the two cameras of at least the three cameras are set at the first camera and the second camera. The images themselves taken by the first camera and the second camera may be used as the first image and the second image, or the images to which some sort of process is performed may be used as the first image and the second image. For example, the image in which an oblique image taken by the second camera is converted into the front image may be used as the second image. The on-first-image position specification process, according to the specifications thereof, can be a general-purpose process (program) which can process the second image depending on settings.

(2) Further, in the image processing apparatus of the invention, the three-dimensional measurement process further may include a process of computing a three-dimensional coordinate using the position specified in the on-first-image position specification process and the position specified in the on-second-image position specification process. In this case, the process of specifying the position on the second image and the process of computing the three-dimensional coordinate are unified in one processing item. Therefore, a user can complete the entire sequence of the three-dimensional measurement with the small number of commands, so that the user can further easily use the image processing apparatus.

(3) Further, in the image processing apparatus of the invention, plural kinds of items of the on-first-image position specification process and plural kinds of items of the three-dimensional measurement process may be provided so as to be able to be set at the sequence element by the selection of a user. The above configuration enables the process contents to be selected in the three-dimensional measurement. Furthermore, the three-dimensional measurement sequences having the number of kinds larger than the number of options of the item in itself can be produced by combining the items, in the case of the plural three-dimensional measurement process items which can be coupled with one on-first-image position specification process item by the selection, or in the case of the plural on-first-image position specification process items which can be coupled with one three-dimensional measurement process item by the selection.

(4) Further, in the image processing apparatus of the invention, in the image processing apparatus of the invention, a three-dimensional measurement basic sequence may be provided so as to be able to be utilized by the selection of a user, the three-dimensional measurement basic sequence including at least one item of the on-first-image position specification process and at least one item of the three-dimensional measurement process. According to the above configuration, a user who is unused to the three-dimensional measurement sequence can further easily utilize the three-dimensional measurement function of the image processing apparatus.

(5) Further, in the image processing apparatus of the invention, a first detection area may be set to the first image to detect an edge position in an edge detection direction, the edge position being determined for the first detection area, in at least one on-first-image position specification process to which the processing item is provided, and a second detection area may be set to the second image, a particularly direction being set at the edge detection direction in the second detection area, the particular direction being determined based on a positional relationship between the first camera and the second camera and the edge position specified in the on-first-image position specification process, in the on-second-image position specification process in at least one three-dimensional measurement process to which the processing item is provided. According to the above configuration, the edge position of the physical object can be measured in the three-dimensional manner.

(6) Further, in the image processing apparatus of the invention, in the second detection area, a range along the edge detection direction may be set based on a range along an optical axis of the first camera which is specified by a user as a three-dimensional measurement target range. Therefore, because the second detection area can be set in the limited range corresponding to the range which a user assumes the existence of the edge of the measurement target, a computation amount can be decreased in the on-second-image position specification process, and the number of malfunctions can be decreased. The generation of the malfunction is attributed to the fact that the edge which is not the measurement target is included in the second detection area.

(7) Further, in the image processing apparatus of the invention, the first camera may have a rectangular visual field range while arranged so as to take the physical object from a front side, the second camera may be located at a position which is separated from the visual field of the first camera in a longitudinal direction or in a crosswise direction, the second camera may be arranged so as to take the physical object from an oblique direction with respect to the direction in which the physical object is seen from the front side, on-first-image position specification means may set the first detection area at a position in the first image based on a user command, and the edge detection direction of the first detection area may be located in a row of the first camera and the second camera.

Therefore, the edge detection direction is located in the row of the cameras in the process of specifying the edge position when the first image is set at the process target, and the longitudinal direction or the crosswise direction of the visual field of the camera becomes the edge detection direction because the second camera is arranged in the longitudinal direction or in the crosswise direction of the visual field of the first camera. The first image is an image in which the physical object is taken from the direction of the front side. The detection area in the first image is set at the position based on the user command, the setting target image is the front image, and the longitudinal direction or the crosswise direction of the visual field of the camera becomes the edge detection direction. Despite the setting for the three-dimensional measurement, the edge detection area can be set as easy as the conventional two-dimensional image processing apparatus. Accordingly, a user can easily use the image processing apparatus.

(8) Further, in the image processing apparatus of the invention, a representative position of an area on the first image having a high degree of correspondence to a model image may be specified in at least one on-first-image position specification process to which the processing item is provided, the model image being previously registered before the measurement is performed, and a representative position of an area on the second image having a high degree of correspondence to the model image may be specified in the on-second-image position specification process in at least one three-dimensional measurement process to which the processing item is provided. According to the above configuration, the representative position of the area on the physical object having the high degree of correspondence to the previously registered model can be measured in the three-dimensional manner.

(9) Further, in the image processing apparatus of the invention, in the on-second-image position specification process, a search area may be set on the second image based on the positional relationship between the first camera and the second camera and the representative positions specified in the on-first-image position specification process, and the representative position of the area having the high degree of correspondence to the model image may be specified in the search area. Therefore, because the search area can be restricted in the range where the measurement target area exists possibly in the second image, a computation amount can be decreased in the on-second-image position specification process, and the number of malfunctions can be decreased. The generation of the malfunction is attributed to the fact that the area on the second image which is not the measurement target corresponds to the model image.

(10) Further, in the image processing apparatus of the invention, the search area may be set based on the range along the optical axis of the first camera specified by a user as the three-dimensional measurement target range. Therefore, because the search area can be set in the limited range corresponding to the range which a user assumes the existence of the measurement target area, the computation amount can be decreased in the on-second-image position specification process, and the number of malfunctions can be decreased. The generation of the malfunction is attributed to the fact that the area on the second image which is not the measurement target corresponds to the model.

(11) Further, in the image processing apparatus of the invention, a representative position of a measurement target area set on the first image based on the user command may be specified to obtain the image in the measurement target area as the model image in at least one on-first-image position specification process to which the processing item is provided, and a representative position of an area on the second image having a high degree of correspondence to the model image may be specified in the on-second-image position specification process in at least one three-dimensional measurement process to which the processing item is provided.

According to the above configuration, the representative position of the area on the physical object having the high degree of correspondence to the model obtained from the first image can be measured in the three-dimensional manner. Because the model is actually obtained from the image which is of the target of the measurement process, the three-dimensional measurement can be performed even if the characters or patterns on the surface which is of the measurement target is changed in each physical object. When the plural areas in the physical object are individually measured, the three-dimensional shape (a three-dimensional coordinate distribution of the physical object surface) can also be obtained.

(12) Further, in the image processing apparatus of the invention, in the on-second-image position specification process, a search area may be set on the second image based on the positional relationship between the first camera and the second camera and the representative positions specified in the on-first-image position specification process, and the representative position of the area having the high degree of correspondence to the model image may be specified in the search area. Therefore, because the search area can be restricted in the range where the measurement target area exists possibly in the second image, the computation amount can be decreased in the on-second-image position specification process, and the number of malfunctions can be decreased. The generation of the malfunction is attributed to the fact that the area on the second image which is not the measurement target corresponds to the model image.

(13) Further, in the image processing apparatus of the invention, the search area is set based on the range along the optical axis of the first camera specified by a user as the three-dimensional measurement target range. Therefore, because the search area can be set in the limited range corresponding to the range which a user assumes the existence of the measurement target area, the computation amount can be decreased in the on-second-image position specification process, and the number of malfunctions can be decreased. The generation of the malfunction is attributed to the fact that the area on the second image which is not the measurement target corresponds to the model.

(14) The solving means realized by the image processing apparatus of the invention can also be comprehended as an image processing method. An image processing method of the invention in which a first image and a second image respectively taken by a first camera and a second camera are used, the first camera and the second camera being arranged so as to take a physical object from different directions, the image processing method including a sequence setting step of setting a sequence of a processing item; and a sequence executing step of executing the set sequence, wherein the sequence setting step provides plural items of two-dimensional image processing and at least one item of a three-dimensional measurement process as the processing item which can be set at a sequence element by selection of a user, the provided items of the two-dimensional image processing include at least one item of an on-first-image position specification process of specifying a position on a physical object in the first image, and the three-dimensional measurement process includes an on-second-image position specification process of specifying a position on a physical object in the second image, the position on the physical object in the second image corresponding to the position on the physical object in the first image which is specified in the on-first-image position specification process belonging to the same sequence as the sequence to which the on-second-image position specification process belongs to.

(15) Further, in the image processing method, the three-dimensional measurement process further may include a process of computing a three-dimensional coordinate using the position specified in the on-first-image position specification process and the position specified in the second on-image position specification process.

(16) An image processing apparatus of the invention which performs a process with a first image and a second image taken by a first camera and a second camera respectively, the first camera having a rectangular visual field range while arranged so as to take a physical object from a front side, the second camera being located at a position which is separated from the visual field of the first camera in a longitudinal direction or in a crosswise direction, the second camera being arranged so as to take the physical object from an oblique direction with respect to the direction in which the physical object is seen from the front side, the image processing apparatus including on-first-image position specification means for specifying a position on the physical object in the first image; on-second-image position specification means for specifying a position on the physical object in the second image, the position on the physical object in the second image corresponding to the position on the physical object in the first image specified by the on-first-image position specification means; and three-dimensional coordinate computation means for computing a three-dimensional coordinate using the position specified by the on-first-image position specification means and the position specified by the on-second-image position specification means, wherein the on-first-image position specification means sets a first detection area at a position in the first image based on a user command, the on-first-image position specification means specifies an edge position in an edge detection direction determined for the first detection area, and the edge detection direction of the first detection area is located in a row of the first camera and the second camera, and the on-second-image position specification means sets a second detection area to the second image, a particular direction is set at the edge detection direction in the second detection area, the particular direction being determined based on a positional relationship between the first camera and the second camera and the edge position specified in the on-first-image position specification means, and the on-second-image position specification means specifies the edge position in the edge detection direction in the second detection area.

According to the image processing apparatus of the invention, the process of specifying the edge position in the detection area which is used in the conventional two-dimensional image processing apparatus can be utilized for the three-dimensional measurement by specifying the edge detection directions for the first image and second image in the above-described manner. Particularly, the edge detection direction becomes the direction in the row of the cameras during the process of specifying the edge position in the case of the target of the first image, and the longitudinal direction or crosswise direction of the visual field of the camera becomes the edge detection direction because the second camera is arranged in the longitudinal direction or crosswise direction of the visual field of the first camera. The first image is an image in which the physical object is taken from the direction of the front side. The detection area in the first image is set at the position based on the user command, the setting target image is the front image, and the longitudinal direction or the crosswise direction of the visual field of the camera becomes the edge detection direction. Despite the setting for the three-dimensional measurement, the edge detection area can be set as easy as the conventional two-dimensional image processing apparatus. Accordingly, a user can easily use the image processing apparatus.

(17) The solving means realized by the image processing apparatus of the invention can also be comprehended as an image processing method in which contents executed by each process means are set at process steps.

As described above, according to the invention, a user can easily use the three-dimensional measurement function because the three-dimensional measurement is performed by the apparatus or method which is highly compatible with the conventional two-dimensional image processing.

BRIEF DESCRIPTION OF THE DRAWINGS

FIG. 5 shows an explanatory view of a data configuration example of a processing item table;

FIG. 10 shows an explanatory view of an example in which a processing item concerning a two-dimensional measurement is added to the basic sequence;

DETAILED DESCRIPTION OF THE PREFERRED EMBODIMENTS

Figure 1:
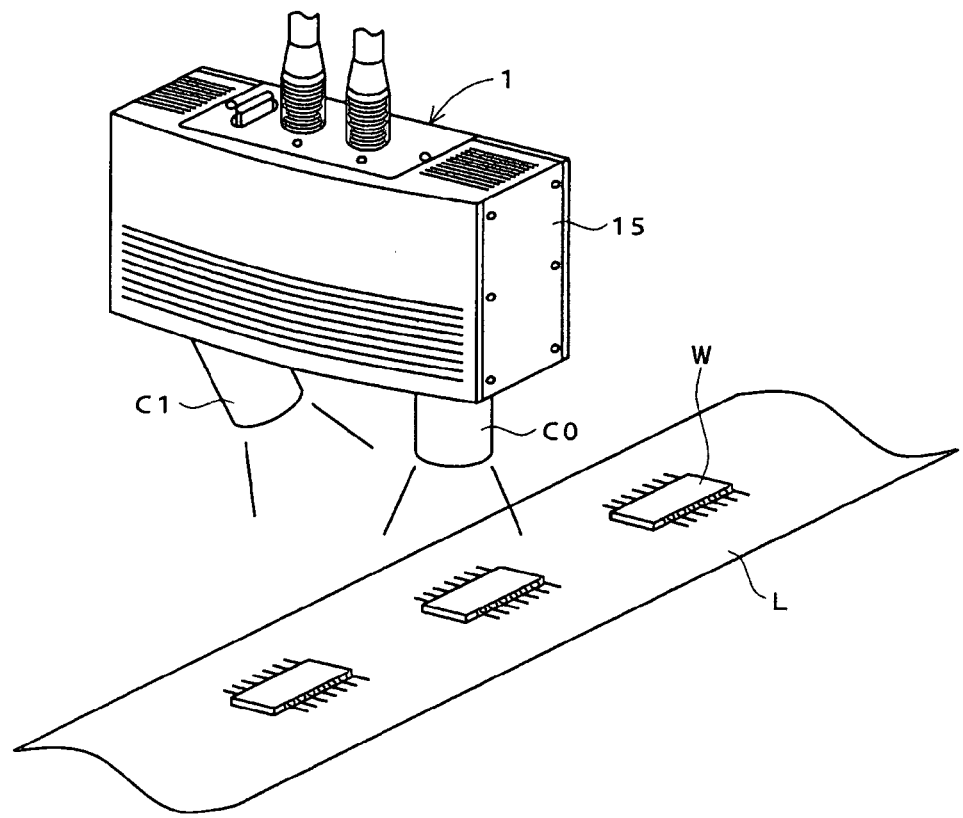
FIG. 1 shows a perspective view of a configuration of an imaging unit of an inspection apparatus to which the invention is applied along with an installation example.

FIG. 1 shows a configuration of an imaging unit of an inspection apparatus (image processing apparatus) to which the invention is applied along with an installation example. The inspection apparatus according to a preferred embodiment of the invention has measurement processing functions used for both the three-dimensional measurement and the two-dimensional measurement. In the inspection apparatus, inspection objects W (hereinafter referred to as "work") conveyed on an inspection line L in a plant are sequentially imaged with an imaging unit 1, and a measurement process or a determination process are performed according to various inspection purposes. The imaging unit 1 is formed by incorporating two cameras C0 and C1 into a chassis 15, and the imaging unit 1 is installed above the inspection line L. The camera C0 is installed while an optical axis of the camera C0 is orientated toward a vertical direction (the work W is seen from the front side). The camera C1 is installed with the optical axis inclined such that a visual field of the camera C1 overlaps that of the camera C0. An imaging surface defining each visual field range of the cameras C0 and C1 is formed in a rectangular shape. The cameras C0 and C1 stand in line such that the camera C1 is located along a crosswise direction (corresponding to x-axis direction of an image A0 of FIG. 2) of the visual field range of the camera C0.

Figure 2:
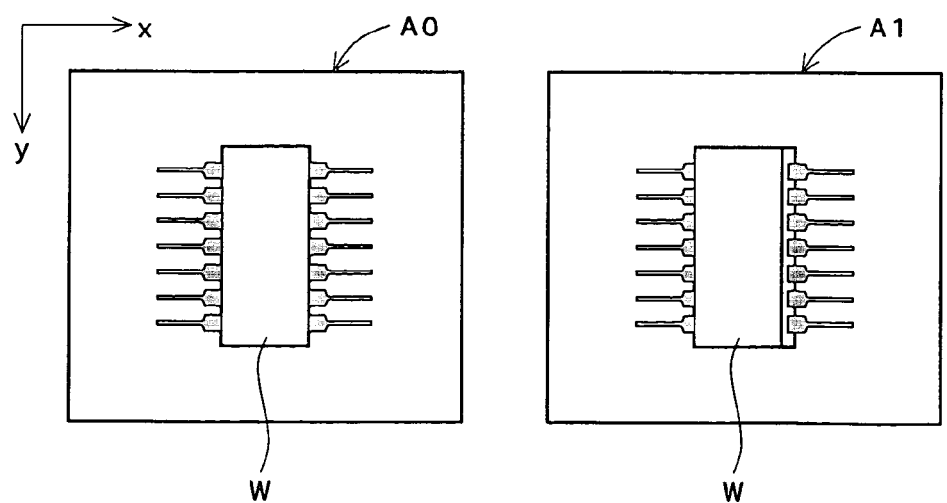
FIG. 2 shows an explanatory view of examples of images generated by cameras.

FIG. 2 shows examples of the images of the work W, which are generated by the cameras C0 and C1. The sign A0 designates an image (corresponding to a first image) from the camera C0, and the sign A1 designates an image (corresponding to a second image) from the camera C1. In the drawings such as FIG. 2 and FIG. 13 in which the image of the work is illustrate, similarly to FIG. 1, the work in the images A0 and A1 are also designated by the sign W. The crosswise direction (horizontal direction) of the image A0 is set at the x-axis direction, and a longitudinal direction (vertical direction) is set at a y-axis direction.

Because the camera C0 is installed while the optical axis is orientated toward the vertical direction, the image A0 shows a state in which an upper surface of the work W is seen from the front side. On the other hand, because the camera C1 is installed while the optical axis is obliquely orientated, the work W emerges on the image A1 while the work is seen from the oblique direction. Focusing on the characteristics of the images, in the inspection apparatus, a measurement target position is specified using the image A0 on the side of the camera C0 in which the image gas small distortion (close to a plan view of the work W), and then a position corresponding to the measurement target position on the image A0 is specified using the image A1 on the side of the camera C1.

Figure 3:
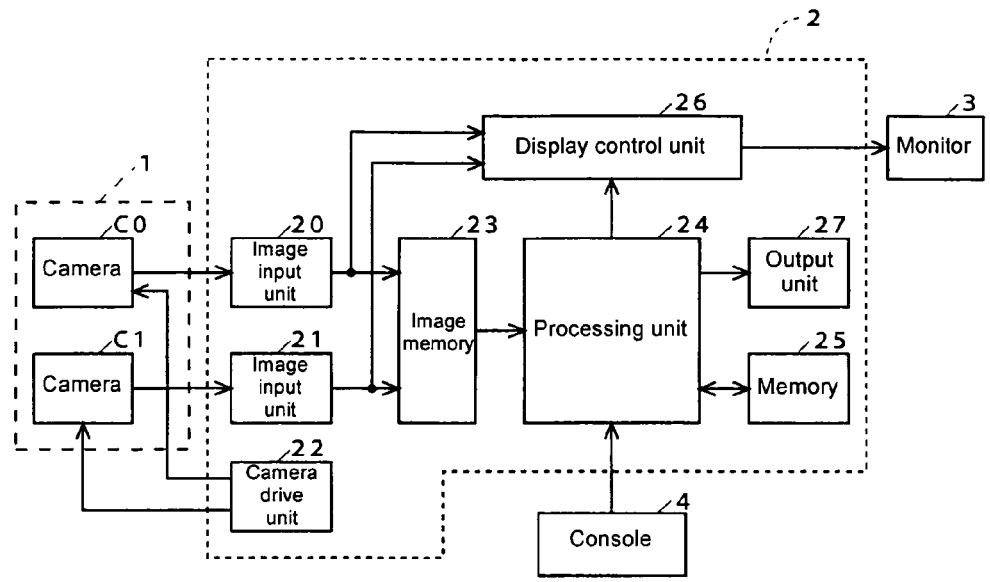
FIG. 3 shows a block diagram of the inspection apparatus.

FIG. 3 is a block diagram showing an entire configuration of the inspection apparatus. In addition to the imaging unit 1, the inspection apparatus includes a main body unit 2, a monitor 3, and a console 4. The main body unit 2 includes image input units 20 and 21 for the cameras C0 and C1, a camera drive unit 22, an image memory 23, a processing unit 24, a memory 25, a display control unit 26, and an output unit 27.

The camera drive unit 22 receives a detection signal from a sensor (not shown) for work detection to simultaneously drive the cameras C0 and C1. The image input units 20 and 21 includes an A/D conversion unit and an image buffer. The image input units 20 and 21 perform digital conversion to image signals generated by the cameras C0 and C1, and digital images (images A0 and A1) for measurement process are generated in the cameras C0 and C1 respectively. The images A0 and A1 are stored in image buffers of the image input units 20 and 21, and the images A0 and A1 are read and stored in the image memory 23 according to a command from the processing unit 24.

The processing unit 24 includes CPU and peripheral circuits thereof. The memory 25 is a non-volatile memory such as EEPROM. Programs (a program for controlling the apparatus operation, a program for executing each image processing item, an image processing sequence, and the like), parameters for three-dimensional measurement (corresponding to a coefficient of a computation formula for computing a three-dimensional coordinate), various data files necessary for the measurement are stored in the memory 25. The processing unit 24 performs the measurement of the work W and the determination process by executing a process to the images A0 and A1, stored in the image memory 23, according to the later-mentioned sequence The display control unit 26 receives the images A0 and A1 from the image input units 20 and 21 to generate a display screen including the images A0 and A1, and the display control unit 26 display the display screen on the monitor 3. The processing unit 24 appropriately controls the display control unit 26 to display measurement result and inspection result along with the images A0 and A1, and the processing unit 24 also controls the display control unit 26 to display the later-mentioned setting screen.

The output unit 27 is an output interface which outputs the results of the measurement process and determination process to an external device such as PLC.

In the inspection apparatus of the embodiment, plural kinds of processing items are prepared to various processes performed for the measurement or inspection, and a user selects the processing items and the executing procedure, which builds a series of sequences from the image input to the process of outputting the executed result.

Figure 4:
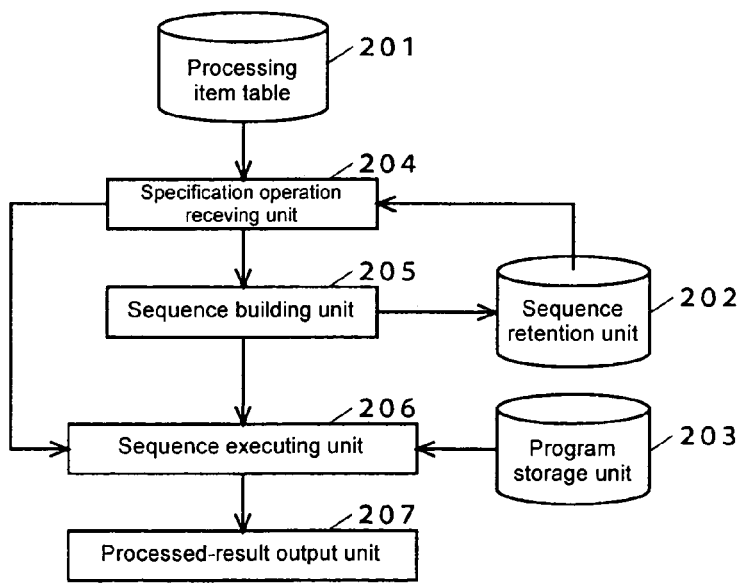
FIG. 4 shows a functional block diagram of a system configuration for setting a sequence.

FIG. 4 shows a system configuration for setting the sequence. The system includes a processing item table 201, a sequence retention unit 202, a program storage unit 203, a specification operation receiving unit 204, a sequence building unit 205, a sequence executing unit 206, and a processed-result output unit 207. The processing item table 201, the sequence retention unit 202, and the program storage unit 203 are stored in the form of a file in the memory 25, and other configurations are a function which is set in the processing unit 24 by the program for controlling the apparatus operation stored in the memory 25.

In each purpose of the process, plural processing items are registered in the processing item table 201. FIG. 5 shows an example of the processing item table. The specific processing items are set in each kind of the processes such as "image input concern," "positional correction concern," and "general measurement concern."

In the processing item table, the processing items belonging to "image input concern" correspond to the purpose of obtaining the process target image. The processing items belonging to "positional correction concern" correspond to the purpose that the position of the measurement target region is kept constant in the image by correcting position shift of the measurement target region on the work in the image.

The processing items belonging to "general measurement concern" corresponds to the purpose that the measurement is performed to the measurement target region, and "general measurement concern" is divided into two kinds of the processes of "positioning" and "measurement." "Positioning" is a process of specifying the measurement target position on the image A0. The position specified by performing the processing item belonging to "positioning" can be used for the three-dimensional measurement, and sometimes the processing item belonging to "positioning" is performed in order to perform the two-dimensional position measurement of itself on the image A0. The measured two-dimensional position can be used for the computation of a dimension between two points on the image A0 and the like.

"Measurement" is a process of finding the position on the image A1 corresponding to the measurement target position specified on the image A0 to compute the three-dimensional coordinate of the measurement target position in the case where the three-dimensional measurement is performed. The two-dimensional measurement processes such as a process of determining an area of the measurement target region for the image A0 and a process of determining average density are also set as the processing item belonging to "measurement."

Returning to FIG. 4, in each processing item registered in the processing item table 201, the program for executing the process of each item is stored in the program storage unit 203. The specification operation receiving unit 204 reads various processing items from the processing item table 201 to display the processing items on the monitor 3, and the specification operation receiving unit 204 receives the specification operation by the console 4. In the specification operation, the processing items to be used are selected, and the executing procedure of the selected processing items is specified.

The specification operation receiving unit 204 transfers received specification contents to the sequence building unit 205, and the sequence building unit 205 builds the sequence according to the specification. The sequence built by the sequence building unit 205 is registered in the sequence retention unit 202. Specifically, the sequence has a data structure in which pieces of code information corresponding to the specified processing items are arranged in the specified order. The processing item table 201, the sequence retention unit 202, the specification operation receiving unit 204, and the sequence building unit 205 corresponds to the sequence setting means, and the sequence executing unit 206 corresponds to the sequence executing means.

After the sequence executing unit 206 reads the sequence stored in the sequence building unit 205, the sequence executing unit 206 sequentially reads the programs corresponding to the processing items constituting the sequence from the program storage unit 203 and sequentially executes the programs. The processed-result output unit 207 outputs the process result finally obtained by executing the sequence.

For the plural frequently utilized measurement purposes, each processing item sequence indicating the flow from the image input to the two-dimensional measurement or the three-dimensional measurement is previously registered in the sequence retention unit 202. Hereinafter the processing item sequence for the frequently utilized measurement purpose is referred to as "basic sequence."

The specification operation receiving unit 204 can call and display various sequences (including the basic sequences) registered in the sequence retention unit 202 and displays the sequences, and the specification operation receiving unit 204 can receives the selection operation. When one sequence is selected to execute the sequence, the process is transferred from the specification operation receiving unit 204 to the sequence executing unit 206, and the selected sequence is executed.

After the selection of the sequence, the specification operation receiving unit 204 can accept an operation of adding the processing item, an operation of partially changing the processing items, and the like. In this case, the selection result of the sequence and subsequent operation contents are transferred to the sequence building unit 205, and the process of editing the selected sequence is performed. For the basic sequence, the addition, change, deletion, and the like of the processing item can freely be performed. The edited sequence is registered by replacing the preceding sequence, or edited sequence can be registered as the new sequence.

Figure 6:
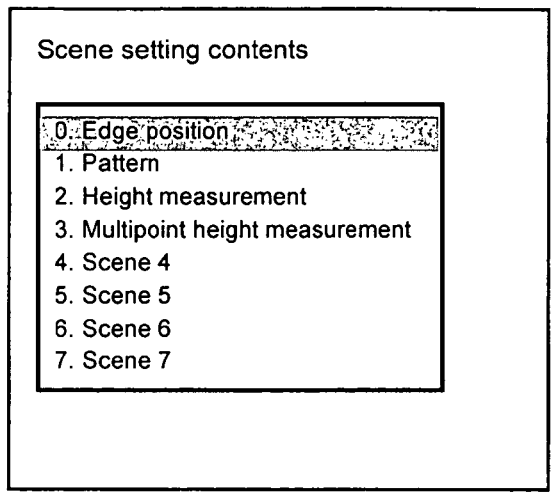
FIG. 6 shows an explanatory view of a menu display example of a sequence.

FIG. 6 shows a menu display example of the sequence registered in the sequence retention unit 202. In FIG. 6, each sequence in the menu is called scene, and an individual "scene name" ("edge position" and the like) is imparted to each sequence. In the display example of FIG. 6, the basic sequence of the three-dimensional measurement is registered in columns 0 to 3 while columns 4 to 7 are unregistered, and initial names such as "scene 4" are displayed in the columns 4 to 7. When the sequence except for the basic sequence is registered, the new name is displayed from the column 4 in the screen.

The basic sequence of the three-dimensional measurement shown in FIG. 6 will briefly be described. "Edge position" is applied in measuring the three-dimensional coordinate at an edge point of the measurement target region. In "edge position," the position of the edge point which is of the measurement target is specified on each of the images A0 and A1 to compute the three-dimensional coordinate of the edge point. "Pattern" is applied in measuring the region including a predetermined pattern such as characters and drawing pattern. In "pattern," a representative position of an area corresponding to the pattern of a previously registered model (hereinafter simply referred to as "model") is specified from the Images A0 and A1, and the three-dimensional coordinate of the representative position is computed.

"Height measurement" is applied in the case where the pattern of the measurement target region is not constant (patterns are different from one another). In "height measurement," the measurement target area and the representative position are specified in the image A0 based on the previously specified position information, the pattern is obtained in the measurement target area, the area corresponding to the pattern obtained from the image A0 is searched to specify the representative position on the image A1, and the three-dimensional coordinate of the representative position is computed from the representative positions of the images A0 and A1.

The above processing item is called "height measurement" because height information (Z coordinate) is frequently obtained while the camera C0 is arranged to see the work from the front side (to vertically see the work).

Although "multi-point height measurement" is basically similar to "height measurement," "multi-point height measurement" is used to measure the heights of plural points in the specified area.

When any one of sequences is selected from the display menu, the monitor screen is changed to the display indicating the contents of the selected sequence.

Figure 7A:
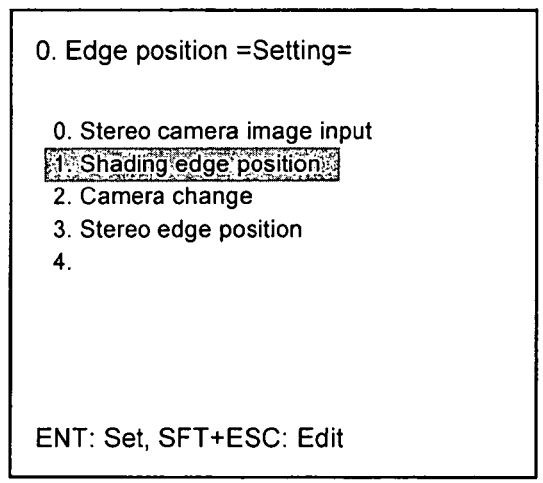
FIGS. 7A and 7B show explanatory views of a sequence of "edge position" and a flowchart thereof while the sequence is caused to respond to the flowchart.
Figure 7B:
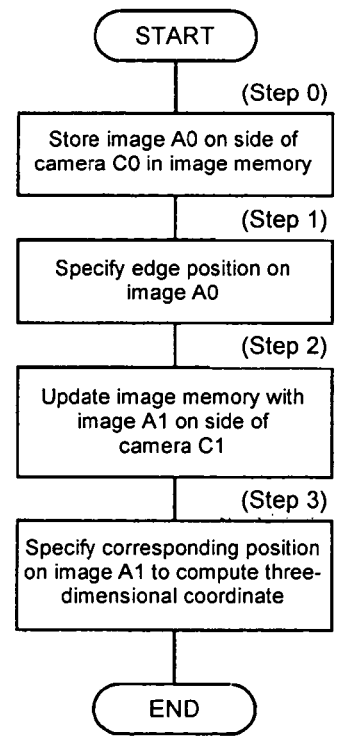

FIG. 7A shows a display screen when "edge position" of FIG. 6 is selected. The processing items to be executed are displayed along with the numericals (0,1, 2, 3) which indicate the executing orders. FIG. 7B shows a flowchart for which the displayed sequence of "edge position" is replaced. IN FIG. 7B, Steps 0 to 3 correspond to the numericals indicating the executing procedure respectively. The process flow of "edge position" will be described below with reference to the flowchart of FIG. 7B.

In Step 0 (stereo camera image input), the cameras C0 and C1 are driven to generate the images A0 and A1, and the image A0 is stored in the image memory 23. The image A1 is also held in the image buffer of the image input unit 11.

In Step 1 (shading edge position), x and y coordinates of the edge position are specified by performing binarization and a projection process to the measurement target area in the image A0. In Step 2 (camera change), the image A1 is read from the image buffer of the image input unit 11 corresponding to the camera C1, and the image memory 23 is updated by the image A1.

In Step 3 (stereo edge position), process target is set at the image A1, and the position corresponding to the edge position specified in Step 1 is specified based on the camera coordinate system correlation between the cameras C0 and C1. The three-dimensional coordinate is computed using the position specified on the image A0 and the position specified on the image A1.

Figure 8A:
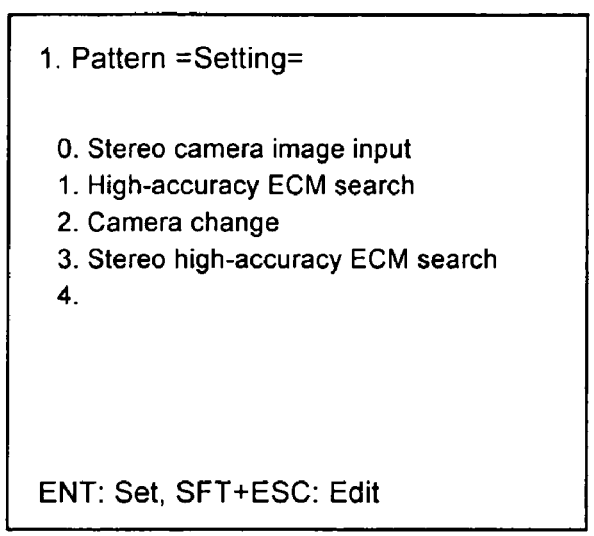
FIGS. 8A and 8B show explanatory views of a sequence of "pattern" and a flowchart thereof while the sequence is caused to respond to the flowchart.
Figure 8B:
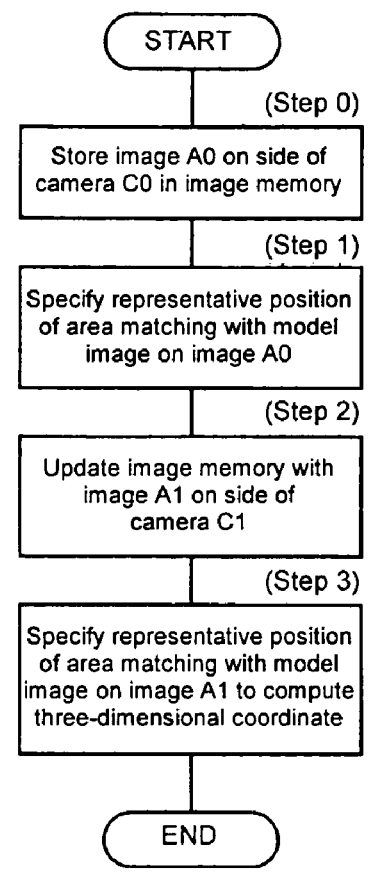

FIG. 8A shows a display example of the monitor 3 when "pattern" is selected in the menu of FIG. 6, and FIG. 8B shows a flowchart for which "pattern" displayed on the display screen is replaced. The process flow of "pattern" will be described below with reference to the flowchart of FIG. 8B.

In Step 0 (stereo camera image input), similarly to Step 0 of the "edge position," the cameras C0 and C1 are driven to generate the images A0 and A1, and the image A0 is stored in the image memory 23.

In Step 1 (high-accuracy ECM (Edge Code Model) search), the process target is set at the image A0 to specify the representative position (for example, a center position of the area) of the area (matching for the model image) having a high degree of correspondence to the previously registered model image. In the process in Step 1, the image A0 is differentiated to extract the point where differentiation of the density is a constant value or more, a density gradient direction (expressed as angle data EC (Edge Code)) is computed at the point, and a distribution pattern of the angle data EC is checked against a distribution pattern of the angle data EC in the model image. Japanese Patent Application Laid-Open No. 2002-230549 discloses the detailed process method.

In Step 2 (camera change), similarly to Step 2 of "edge position," the image memory 23 is updated by the image A1 on the side of the camera C1. In Step 3(stereo high-accuracy ECM search), similarly to the image A0, the process target is set at the image A1 to specify the representative position (for example, the center position of the area) of the area having a high degree of correspondence to the previously registered model image. Then, the three-dimentional coordinate is computed using the position specified on the image A0 and the position specified on the image A1.

Similarly, for the basic sequence of the three-dimensional measurement, the process target is set at the image A0 on the side of the camera C0 to specify the position of the point or the representative position of the area which is of the target of the three-dimensional measurement. Then, the process target is changed to the image A1 to determine the position of the point or the representative position of the area which corresponds to the position specified on the side of the image A0, and the three-dimensional coordinate or the Z coordinate is computed.

Referring to the processing item table 201 shown in FIG. 5, Step 0 and Step 2 of FIGS. 7 and 8 correspond to the processing items of the image input concern. Step 1 corresponds to the processing items of the positioning concern, and Step 3 corresponds to the processing items of the measurement concern. In order to perform the three-dimensional measurement with the configuration of the inspection apparatus the embodiment, it is necessary to select the processing items corresponding to the processes of Steps 0 to 3 (however, Step 2 is not required when both the images A0 and A1 can be stored in the image memory).

In the basic sequence of the three-dimensional measurement, the processing items corresponding to the processes of Steps 0 to 3 is already selected, so that a user can perform the measurement process according to the purpose by selecting the conditions that specify the position of the inspection target region of the work W or the basic sequence suitable for the measurement purpose.

It is also possible that both plural processing items of the positioning concern and the plural processing items of the measurement concern are selected in one sequence. For example "edge position" and "high-accuracy ECM search" can be selected as the positioning concern and "stereo edge position" and "stereo high-accuracy ECM search" can be selected as the measurement concern. In this case, the position specified by the process of "edge position" is imparted to the process of "stereo edge position," and the specification of the corresponding position and the computation of the three-dimensional coordinate are performed in the process of "stereo edge position." The position specified by the process of "high-accuracy ECM search" is imparted to the process of "stereo high-accuracy ECM search," and the specification of the corresponding position and the computation of the three-dimensional coordinate are performed in the process of "stereo high-accuracy ECM search."

In one sequence, it is also possible to set the same processes plural time. For example, the same processes of "high-accuracy ECM search" are set plural times, and the same number of processes of "stereo high-accuracy ECM search" as "high-accuracy ECM search" can be set. In this case, the three-dimensional coordinate is computed in each pair of the process of "high-accuracy ECM search" (positioning) and the process of "stereo high-accuracy ECM search" (measurement).

It is necessary to specify the performance of the three-dimensional measurement with which pair of the positioning process (first on-image position specification process) and the measurement process (second on-image position specification process). Specifically, a numerical indicating what number of the positioning process corresponding to the process in the sequence is included in the setting items for each measurement process.

Alternatively, in the case where the images A0 and A1 are simultaneously stored in the image memory 23, because Step of "camera change" is not required, the positioning process and the three-dimensional measurement process may be treated in pairs, when the positioning process and the three-dimensional measurement process are sequentially continuously set in the sequence.

Although only the processing items necessary for the three-dimensional measurement are set in the basic sequences of FIGS. 7 and 8, other processing items can be added if required. FIG. 9 shows an example in which the processing item of the positional correction concern is added to the basic sequence of "edge position" of FIG. 7. The user operation procedure in the case of the addition of the processing item will be described below with reference to flow of FIG. 9.

A user places a cursor 31 on the processing item executed immediately after the newly added process (FIG. 9A), and the user performs the edit operation (in this case, the user simultaneously operates a shift key and an enter key). When the edit operation is performed, as shown in FIG. 9B, a selection box 32 is set in the display screen, and a word (change, insert, and the like) indicating an edit method is displayed in the selection box 32.

Figure 9A:
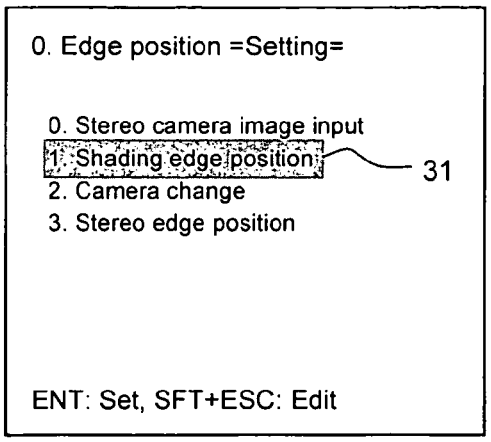
FIGS. 9A, 9B, 9C, 9D and 9E show explanatory views of an operational procedure when another processing item is added to a basic sequence of "edge position"
Figure 9B:
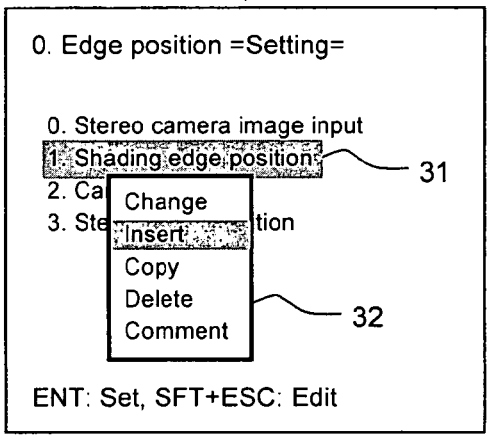
Figure 9C:
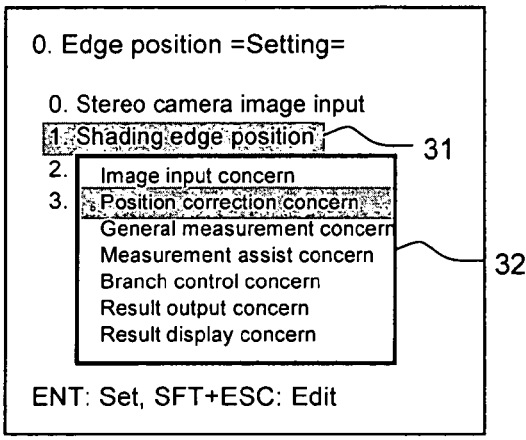
Figure 9D:
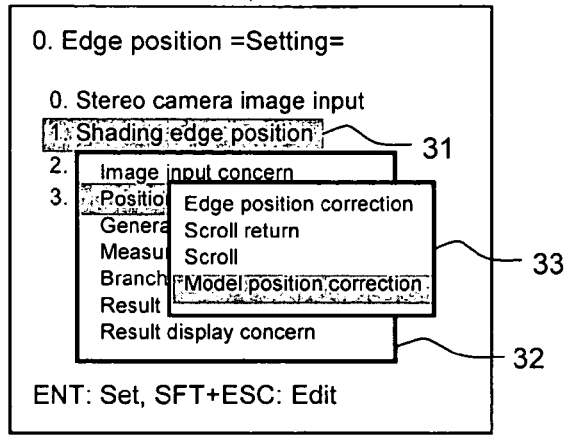
Figure 9E:
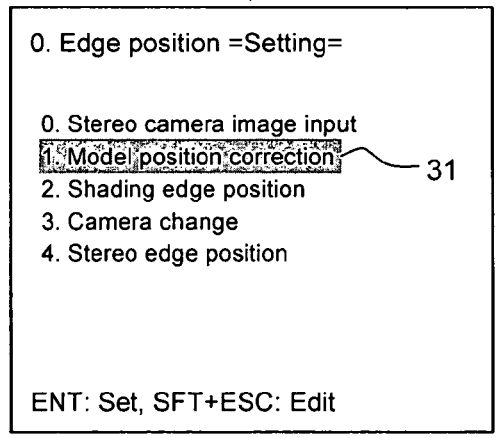

When the user selects "insert" in the selection box 32, as shown in FIG. 9C, the selection box 32 is changed to display the setting item in the column of type of the processing item table 201. When the user selects the predetermined item ("positional correction concern" in the example of FIG. 9C), as shown in FIG. 9D, a new selection box 33 is set to display the processing items included in the selected type. When the user selects the desired item ("model position correction" in the example of FIG. 9D), as shown in FIG. 9E, the selected processing item is inserted into the position specified by the cursor 31 in the basic sequence.

In the selection box 32 of FIG. 9B, when the user selects "change," the currently selected processing item (shading edge position) can be replaced for another processing item. The currently selected processing item can be deleted by selecting "delete." The currently selected processing item can be stored to set the same item in another Step by selecting "copy." The copy function can be utilized in the case where the plural measurement target regions (IC leads) exist to necessary to specify the measurement position in each measurement target region like the work W shown in FIGS. 1 and 2.

The edition of the basic sequence is described in the above embodiment. However, in the case where the necessary processing item is directly read from the processing item table 201 to perform complete manual setting without using the basic sequence, the same selection boxes 32 and 33 as those of FIG. 9 are displayed, so that the user can select the necessary processing item without question.

Not only the processing item for the three-dimensional measurement process but also the processing item for the two-dimensional measurement process are registered in the processing item table 201. For example, a pattern matching process is registered as the processing item for inspecting a print state of the characters printed on the work W, or a process of computing a density average value or density deviation is registered as the processing item for detecting a fault such as a flaw and a chip. These processing items are incorporated into the sequence along with the processing items of the three-dimensional measurement, which allows the measurement processes of the two-dimensional and three-dimensional to be efficiently performed.

FIG. 10 shows an example in which a process of performing the two-dimensional measurement is added to the basic sequence of "edge position" of FIG. 7. In the example of FIG.

10, "density average and deviation" is set as the processing item concerning the two-dimensional measurement after "stereo camera image input" of Step 0, and the processing items similar to the basic sequence are set subsequent to "density average and deviation."

Referring to the edited sequence, the image A0 stored in the image memory 23 is set at the process target to perform the process of computing the density average and deviation, the target position of the three-dimensional measurement is specified using the same image A0, and then the transition to the process for the image A1 is made. Therefore, the same images as the three-dimensional measurement can be used for the two-dimensional measurement. The number of updates for the image memory 23 can be limited to once like the basic sequence, so that the delay of the process can be prevented.

Then, the above embodiment will be described in more detail. In the following description, the image A0 taken by the camera C0 is referred to as "front image A0" and the image A1 taken by the camera C1 is referred to as "oblique image A0."

Figure 11:
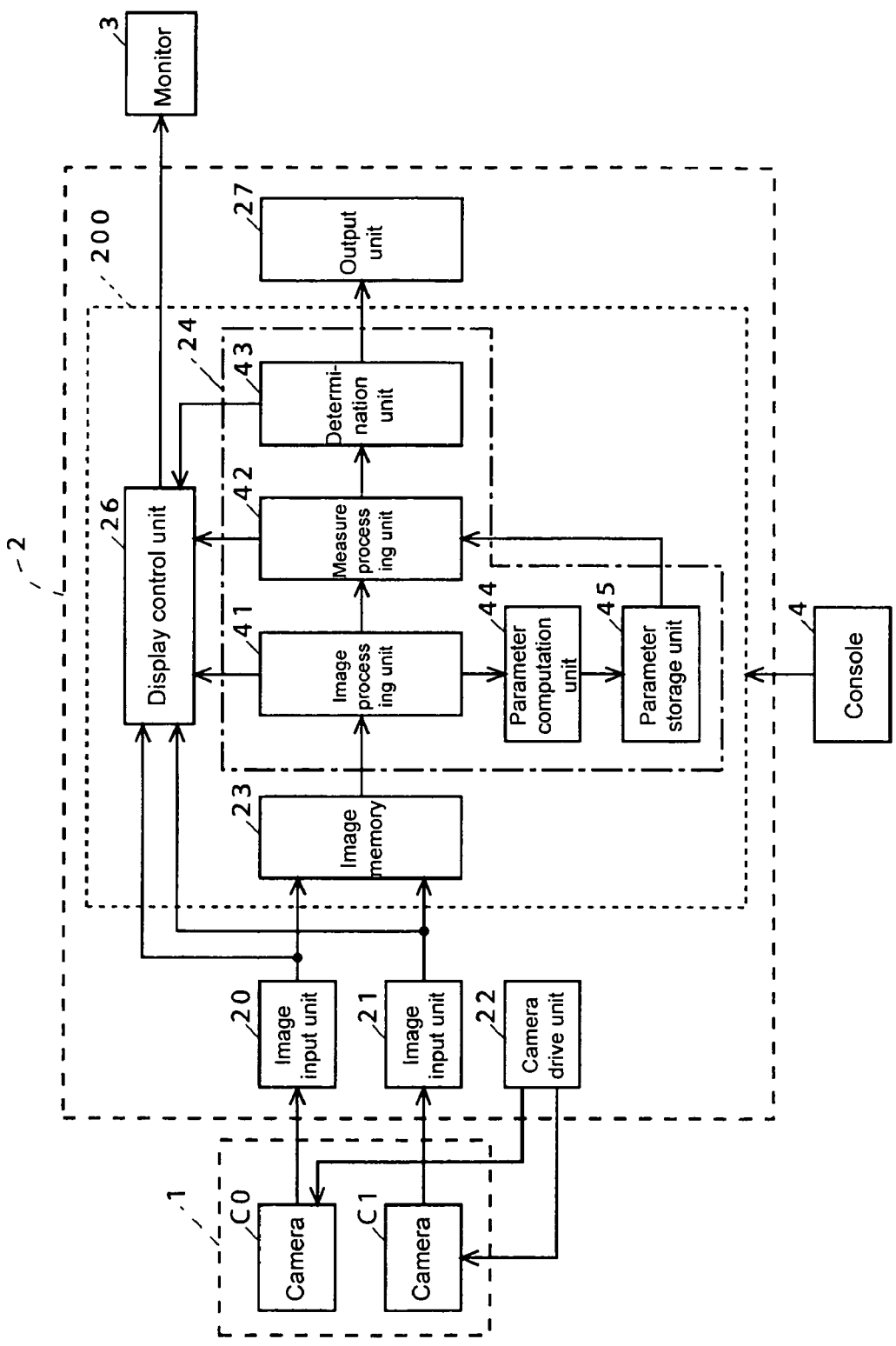
FIG. 11 shows a block diagram of an inspection apparatus.

FIG. 11 is a block diagram showing an entire configuration of the inspection apparatus, and FIG. 11 shows contents of the inspection apparatus of FIG. 3 in more detail. The description of the same component as that shown in FIG. 3 will be omitted. An intra-apparatus computer 200 is provided in the inspection apparatus of FIG. 11.

The intra-apparatus computer 200 performs the measurement process using each image of the cameras C0 and C1, and the intra-apparatus computer 200 determines whether the work W is acceptable of defective from the result of the measurement process. In addition to the image memory 23 in which the images A0 and A1 are stored, the intra-apparatus computer 200 includes an image processing unit 41, a measurement processing unit 42, a determination unit 43, the display control unit 26, a parameter computation unit 44, and a parameter storage unit 45. The units except for the image memory 23 and the parameter storage unit 45 are a function which is set in the intra-apparatus computer 200 by a dedicated program. The image memory 23 and the parameter storage unit 45 are set in the memory (such as RAM and EEPROM) of the intra-apparatus computer 200.

In the above configuration, the image processing unit 41, the measurement processing unit 42, the determination unit 43, the parameter computation unit 44, and the parameter storage unit 45 correspond to the processing unit 24 of FIG. 3. A memory (not shown, corresponding to the memory 25 of FIG. 3) for registering information necessary for the inspection (such as setting conditions of the inspection area and model image) is also provided in the intra-apparatus computer 200. The process of registering the information in the registration memory or the process performed by each unit of the intra-apparatus computer 200 can appropriately be set or changed according to the operation of the console 4.

The image processing unit 41 extracts a constituting point of the work W by the binarization, the edge extraction, the pattern matching, and the like. The measurement processing unit 42 performs the process of measuring the position, the size, and the like with respect to the inspection target region extracted by the image processing unit 41. The image processing unit 41 and the measurement processing unit 42 are set so as to select and perform the two-dimensional process and the three-dimensional process.

The determination unit 43 compares the measurement result of the measurement processing unit 42 to a predetermined threshold to determine whether the work W is acceptable or defective. The measurement result and the determination result are outputted to the output unit 27 and the display control unit 26. The display control unit 26 controls the display operation of the monitor 3. The display control unit 26 can cause the monitor to simultaneously display the front image A0 and the oblique image A1, generated by the image input units 20 and 21, in one screen. The display control unit 26 can also receive the process results of the image processing unit 41, measurement processing unit 42, and determination unit 43 to cause the monitor to appropriately display the process results along with the image.

Various coefficients included in the computation formula for the three-dimensional measurement are stored in the parameter storage unit 45. These coefficients (hereinafter the coefficients are referred to as "parameter") are varied according to correlation (a distance between origins of coordinates, a rotational shift amount of spatial coordinate system, and the like) between a stereo coordinate system formed by the cameras C0 and C1 and the spatial coordinate system indicating the position in the actual space. The parameters are computed by the image processing unit 41 and the parameter computation unit 44 in advance of the inspection, and the parameters are stored in the parameter storage unit 45. A calibration work having plural feature points is used in the process of computing the parameter. The parameter constituting a homography matrix of the later-mentioned computation formula (1) is also registered in the parameter storage unit 45.

In the inspection apparatus of the embodiment, the inspection algorithm (sequence) can be built by presenting the plural kinds of the inspection menus (processing item or sequence of the registered processing item) to the user to receive the selection operation. The inspection by the two-dimensional measurement process and the inspection by the three-dimensional measurement process can be selected and performed according to the inspection target region. In the inspection performed by the two-dimensional measurement process, the front image A0 from the camera C0 is set at the process target. Then, the pattern matching process, the binarization process, the edge extraction process, and the like are performed to extract the whole work or the inspection target region of the work.

In the embodiment, the speed of the three-dimensional measurement process is increased by effectively utilizing the front image A0 from the camera C0 for the inspection by the three-dimensional measurement process. The speedup of the three-dimensional measurement process will be described later.

Figure 12:
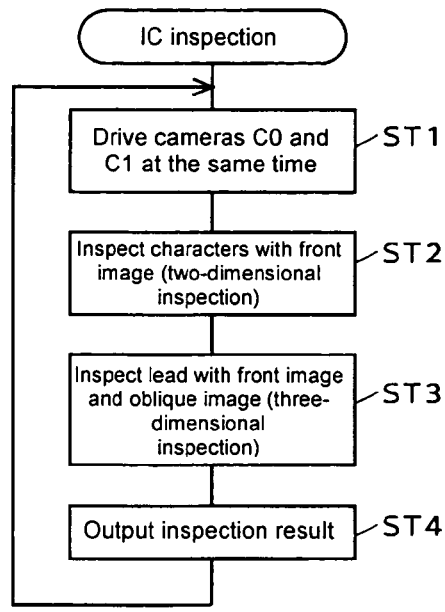
FIG. 12 shows a flowchart of a procedure concerning IC inspection.

Taking the IC inspection with the inspection apparatus as an example, the processes concerning the inspection will be described in detail. FIG. 12 shows the inspection procedure when the work is IC. The procedure is started by receiving a detection signal from a work detection sensor. In ST1 (hereinafter Step is abbreviated as ST), the camera drive unit 12 simultaneously drives the cameras C0 and C1 to generate the front image A0 and the oblique image A1.

The inspection of the characters printed on a package portion of IC is performed in ST2. In the inspection, two-dimensional image processing is performed only using the front image A. For example, the character printed area is extracted by the pattern matching process, and it is determined whether the character printed state is acceptable of defective according to a degree of correlation during the matching or the matching position.

In ST3, the leads on both sides of IC are set at the inspection target. In the inspection, the three-dimensional coordinate of a front end portion in each lead is determined by the three-dimensional measurement process using both the front image A0 and oblique image A1, and it is determined whether anomaly such as floating and bending is generated in the front end portion of each lead based on the three-dimensional coordinate.

When the inspections of ST2 and ST3 are ended, the inspection results are outputted to the external device and the monitor 3 in ST4. When the next IC is detected by the work detection sensor, the flow returns to ST1, and the same procedure is performed.

Thus, the inspection performed by the two-dimensional measurement and the inspection performed by the three-dimensional measurement can continuously be performed by imaging the work W once with the two cameras C0 and C1. The front image A0 is used in the two-dimensional measurement process, measurement process can accurately be performed with the image in which the characters have no distortion.

In performing the three-dimensional measurement process, the point of the measurement target is specified between the front image A0 and the oblique image A1, and the computation is performed by applying the three-dimensional coordinate to the computation formula based on a triangular principle.

Figure 13:
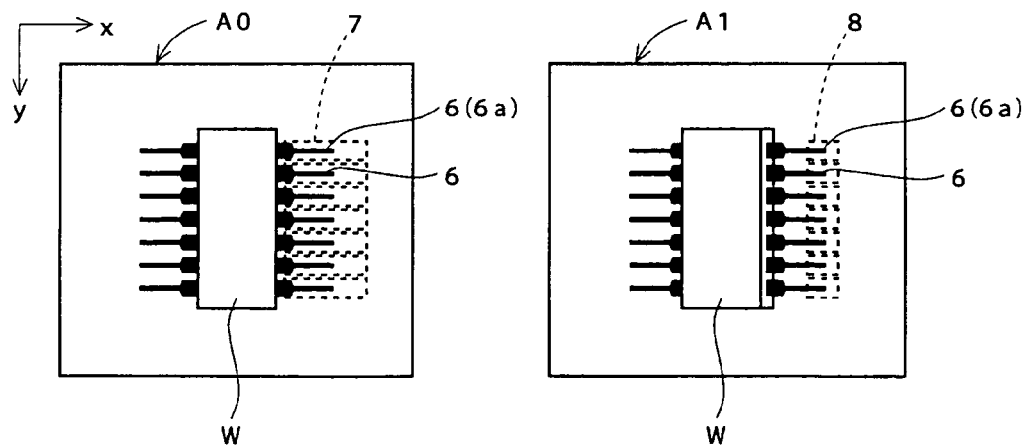
FIG. 13 shows an explanatory view of a setting example of a detection area.

FIG. 13 shows setting examples of the detection area in the front image A0 and the detection area in the oblique image A1. Similarly to FIG. 2, the longitudinal direction (direction along an array of the leads in the front image A0) of the image is set at the y direction, and the crosswise direction (direction along the length of lead in the front image A0) is set at the x direction. In the front image A0, a detection area 7 is set in each lead 6, and one edge point corresponding to a front end of the lead is specified in each detection area 7.

In this case, because the cameras C0 and C1 are arranged in the x direction, a parallax is mainly generated in the x direction. Therefore, a histogram is produced by binarizing the image in the detection area 7 to project the obtained binary image along the y direction. In the histogram, the x direction is set at a horizontal axis, and the number of "bright" pixels or the number of "dark" pixels is set at a vertical axis. An x coordinate where histogram is rapidly changed is set at an x coordinate of the front end of the lead 6. On the other hand, a y coordinate of a midpoint in the y direction of the detection area 7 is set at a y coordinate of the front end of the lead 6. In this case, the image in the detection area 7 is binarized. Alternatively, in the shading image in the detection area 7, density of each pixel is integrated in the y direction, and the x coordinate may be determined at the point where the obtained integral density distribution is rapidly changed in the x direction (for example, the point where the integral density distribution intersect a threshold). Thus, in the detection area 7, the particular one direction becomes the edge detection target. In FIG. 13, the x direction becomes the edge detection direction, and the edge detection target is specified for the detection area 7 after the detection area 7 is set in the front image A0. Alternatively, the detection area 7 including the unique edge detection direction may be set in the front image A0, or the detection area 7 is set in the front image A0 after the edge detection direction of the detection area 7 is specified.

In the oblique image A1, a detection area 8 is set in each lead 6. The detection area 8 is set by using the coordinate of the edge point specified in each detection area 7 of the front image A0, a height range (height range of the inspection target region) specified by a user, and the like based on the later-mentioned computation formula (1) which converts one point on one image into one point on the other image. The height range is a three-dimensional measurement target range along the optical axis of the camera C0.

Although only the area setting for the leads on the right sides of the work W is shown in FIG. 13, the same setting is performed for the leads on the left side (the same holds true for the following drawings).

Figure 14:
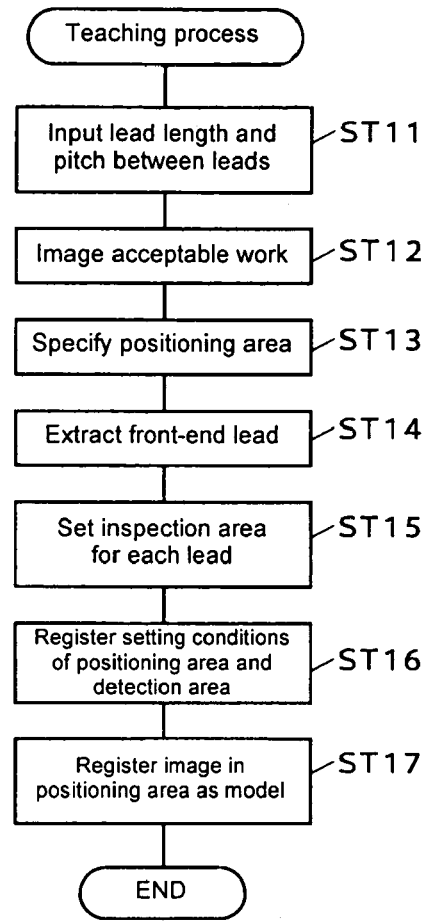
FIG. 14 shows a flowchart of a procedure of a teaching process.

FIG. 14 shows a procedure of a teaching process for the IC lead inspection. The procedure of FIG. 14 is performed before the IC inspection of FIG. 4 is started. In ST11, the length of lead 6, a pitch between the leads 6, and the like are inputted for the work W (IC in this example) of the inspection target. The input data is registered in a working memory, and the data is used in ST15.

In ST12, the acceptable work is placed at the imaging target position, and the acceptable work is taken by the cameras C0 and C1. In the teaching process, it is necessary to generate only the front image A0 from the camera C0. However, in the embodiment, the cameras C0 and C1 are simultaneously driven even in the teaching process, and the two generated images are display on the monitor 3.

Figure 15:
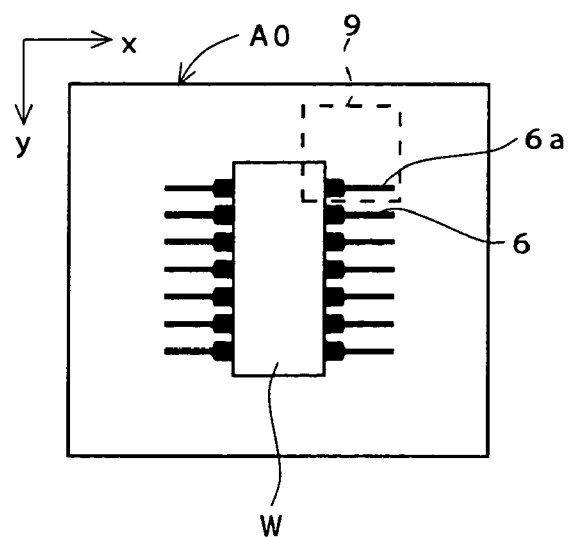
FIG. 15 shows an explanatory view of a setting example of a positioning area.

In ST13, the positioning area is specified in the front image A1. FIG. 15 shows a display example of the front image A1 during the specification operation. In FIG. 15, the numeral 9 designates positioning area. The positioning area 9 is used to extract the lead (the front-end lead 6a in FIG. 15, hereinafter referred to as "front-end lead 6a") located at the end of the array of the leads 6. In FIG. 15, the square area 9 is set so as to include only the front-end lead 6a. In the positioning area 9, even if the position of the work W is shifted within an envisaged extent, the size of the positioning area 9 is adjusted such that the front-end lead 6a can be imaged in the positioning area 9. The positioning area 9 is also set such that the front-end lead 6a is imaged in a lower half range of the positioning area 9. Therefore, because the lead is not imaged in the upper half range of the positioning area 9, it can be confirmed that the lead imaged in the lower half range of the positioning area 9 is the front-end lead 6a.

Returning to FIG. 14, when the positioning area 9 is specified, the front-end lead 6a is extracted from the positioning area 9 in ST14. In the extraction process, for example, the y coordinate of the front-end lead 6a is determined by the method, in which the image in the positioning area 9 is binarized and the binarized image is projected along the x-axis direction. Alternatively, a borderline of the lead may be extracted to determine the center line of the lead by extracting an edge or a density gradient direction in the positioning area 9.

In ST15, the detection area 7 is set in each lead 6 based on the y coordinate of the front-end lead 6a and the data inputted in ST11. In the embodiment, the length of the lead 6 and the pitch between the leads 6 on the image are computed with the data inputted in ST11, the number of pixels of camera C0, magnification, and the like, and the size of each detection area 7 and an interval between areas are determined based on the computed values. The detection area 7 having the size determined in each interval is set at each of the leads 6 including the front-end lead 6a based on the position of the front-end lead 6a. This is because the front image A0 in which characteristics (such as equal length of each lead and equal pitch between leads) in the inspection target region of the work W are directly reflected is used. Accordingly, when the front-end lead 6a can be extracted, the detection area 7 can be set in all the leads 6 even if another lead 6 is not extracted, so that the process efficiency can largely be improved.

Figure 16:
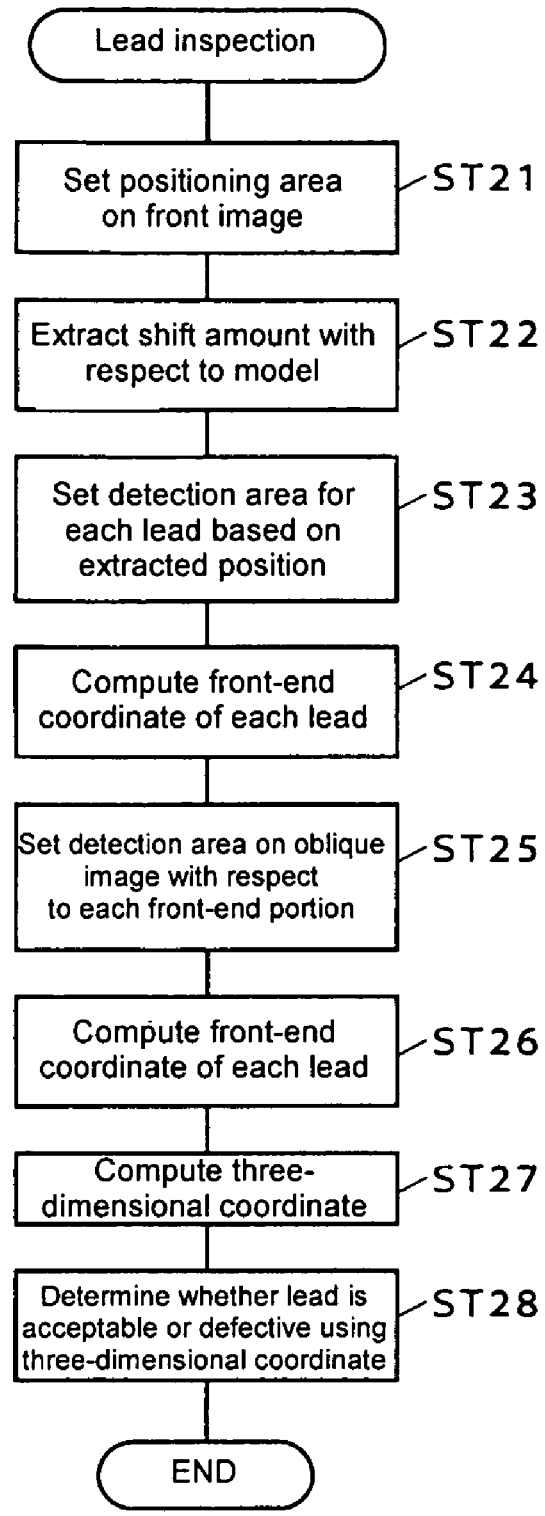
FIG. 16 shows a flowchart of a detailed procedure of lead inspection.

In ST16, the setting conditions (the position and size of the area) of the positioning area 9 specified in ST13 and the setting conditions of the detection area 7 specified in ST15 are registered in a registry memory. In ST17, the image in the positioning area 9 is registered as the model in the registry memory. Then, the teaching process is ended. It is desirable that image showing the setting result of the detection area 7 is displayed on the monitor 3 to perform the registry according to confirmation operation of a user prior to ST16. At this point, the position and size of the detection area 7 may finely be adjusted FIG. 16 shows a detailed procedure for the IC lead inspection (ST3 in FIG. 12). The processes from ST21 to ST24 in the procedure of FIG. 16 are performed to the front image A0. In ST21, the positioning area 9 is set in the front image A0 based on the setting conditions registered in the teaching process. In ST22, the image in the positioning area 9 is collated with the model registered in ST17 of the teaching process, a shift amount is extracted with respect to the model (for example, a pattern matching technique can be applied to the process). ST21 and ST22 correspond to the processing item of "model position correction" in the processing item table 201.

In ST23, the setting conditions of the detection area registered in the teaching is adjusted based on the shift amount extracted in ST22, and the detection area 7 of each lead is set according to the post-adjustment setting conditions. In the front image A0, because it is not necessary to consider the distortion of the work W, the shift amount of positioning area 9 can directly be applied to each detection area 7, and the detection area 7 can be set for each lead 6 while the same positional relationship as the teaching process is held.

Figure 17:
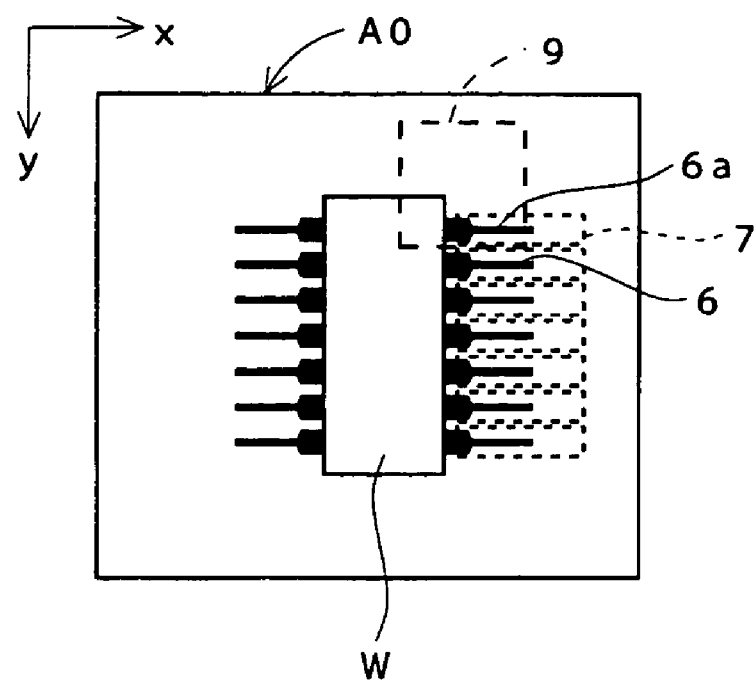
FIG. 17 shows an explanatory view of a relationship between the positioning area and the detection area for the work in a front image during inspection.

FIG. 17 shows an example of the front image A0 during the inspection. Because the work W of FIG. 17 is shifted rightward compared with the image A0 of FIG. 7 in the teaching, the front end of the lead 6 is protruded from the positioning area 9. However, the above adjustment process is performed for the detection area 7, so that the detection area 7 is set in each lead on the same conditions as FIG. 4.

When the detection area 7 is set in each lead, the x and y coordinates of the front end of the lead are computed in each detection area 7 in ST24. ST23 and ST24 correspond to the processing item of "shading edge position" in the processing item table 201. The processing item is repeatedly set with the same number of repetitions as the number of leads. The processing item of "camera change" is performed (not shown) after the processing item of "shading edge position."

In ST25, the detection area 8 for the front end portion of each lead is set on the oblique image A1. In ST26, the same process as ST24 is performed to compute the x and y coordinates of the front end of the lead in the set detection area 8.

In ST27, the three-dimensional coordinate of each front end is computed using the coordinates computed in ST24 and ST26. In ST28, the computed three-dimensional coordinate is compared to a previously registered reference value to determine whether the front end portion of each led is acceptable or defective. For example, when the floating exists in the front end portion, the z coordinate expressing the height exceeds the reference value, and it is determined that the front end is defective. ST25 to ST27 correspond to the processing item of "stereo edge position." The processing item is repeatedly set with the same number of repetitions as the number of leads.

Figure 18:
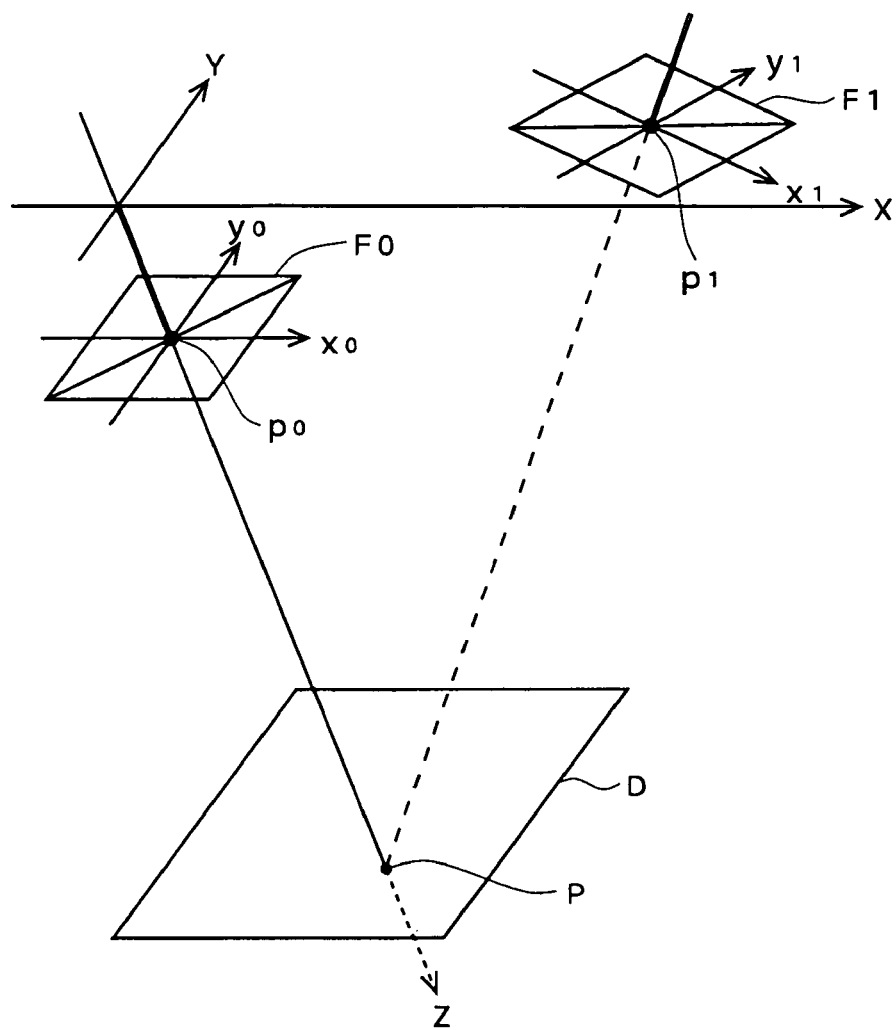
FIG. 18 shows an explanatory view of a relationship of corresponding point between images.

Then, the setting of the detection area 8 in ST25 will be described in detail. FIG. 18 shows state in which a point P on a plane D located at an arbitrary height position in a space is imaged on point $p_0$ and $p_1$ on imaging surfaces F0 and F1 of the cameras C0 and C1 respectively. In FIG. 18, X, Y, and Z are a coordinate axis expressing a three-dimensional space, and a plane D is parallel to an XY plane. A two-dimensional coordinate system having $x_0$ and $y_0$ axes is set in the imaging surface F0 and a two-dimensional coordinate system having $x_1$ and $y_1$ axes is set in the imaging surface F1. In FIG. 18, the position of the point P can arbitrarily set on the plane D.

Assuming that the coordinate of the imaging position (point $p_0$) in the imaging surface F0 of the point P is set at $(x_{cam0}, y_{cam0})$ while the coordinate of the imaging position (point $p_1$) in the imaging surface F1 of the point P is set at $(x_{cam1}, y_{cam1})$, the relationship between the points $p_0$ and $p_1$ is obtained by the following formula (1).

[Formula 1]

$$\lambda \begin{bmatrix} x_{cam1} \\ y_{cam1} \\ 1 \end{bmatrix} = H_z \begin{bmatrix} x_{cam0} \\ y_{cam0} \\ 1 \end{bmatrix} \quad (1)$$

In the formula (1), $H_z$ is a 3×3 homographic matrix expressing the relationship between the imaging position on the imaging surface F0 and the imaging position of the imaging surface F1 with respect to the plane D having the height Z, and $\lambda$ is a constant. The matrix $H_z$ can previously be determined by calibration with the already know coordinate on the plane D (for detail of the calibration, see N. Miichi, T. Wada, T Matsuyama "Study on calibration of the projector camera system" the Internet URL:http://vision.kuee.kyoto-u.ac.jp/Research/Thesis/Thesis_PDF/Miichi_2002_P_147.pdf).

Assuming that the front end of the lead extracted in each detection area 7 of the front image A0 is the point $p_0$ to substitute the coordinate of the point $p_0$ for $(x_{cam0}, y_{cam0})$ of the formula (1), it can be thought that the computed $(x_{cam1}, y_{cam1})$ corresponds to the position of the front end of the lead in the oblique image A1. However, when the height of the front end of the lead is fluctuated, the height Z of the plane D is also fluctuated, and the homographic matrix $H_z$ is changed with the fluctuation in height Z of the plane D. Accordingly, $(x_{cam1}, y_{cam1})$ is also changed.

Figure 19:
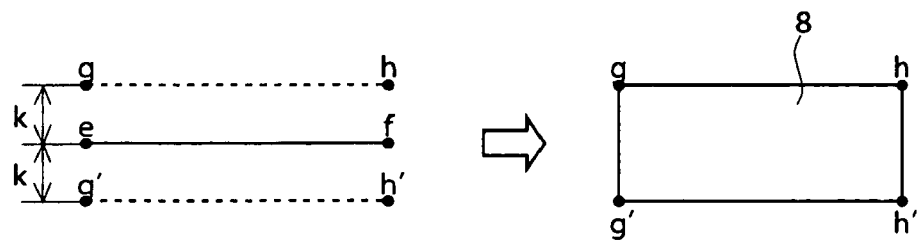
FIG. 19 shows an explanatory view of a method of setting the detection area.

In ST25, on the basis of the above principle, the coordinates of two points e and f shown in FIG. 19 are obtained as $(x_{cam1}, y_{cam1})$ by computing the formula (1) with the homographic matrix $H_z$ according to each height Z, both in the case the upper limit of envisaged height range (the three-dimensional measurement target range along the optical axis of the camera C0) is set at the height X of the plane D and in the case where the lower limit is set at the height Z. As shown in FIG. 19, in the oblique image A1, a line segment gh and a line segment g'h' are formed, and a rectangular area ghh'g' is set at the detection area 8. The line segment gh and the line segment g'h' are moved by a half-value width k of the detection area 7 on the side of the front image A0 in parallel with a line segment ef on both sides in the direction perpendicular to the line segment ef.

Figure 20A:
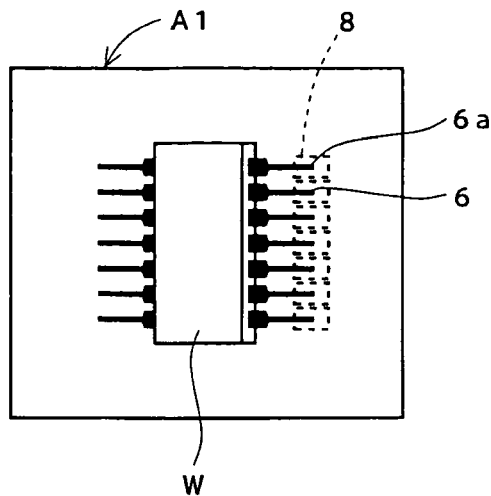
FIGS. 20A and 20B show explanatory views of a relationship between a height range and the detection area.
Figure 20B:
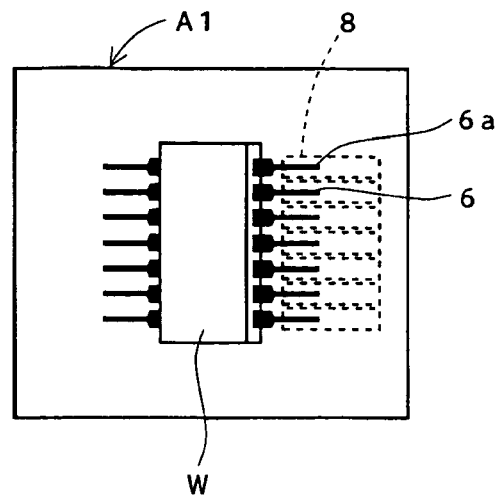

FIG. 20 shows size comparison of the detection area 8 between the case where the possible height of the lead 6 ranges from 0 to 5 mm with respect to the oblique image A1 similar to FIG. 13 and the case where the height ranges from −15 to 15 mm. As can be seen from FIG. 20, the detection area 8 is decreased as the fluctuation width of the height range is decreased. Although the detection areas 8 are shown in parallel for the purpose of simplification in FIG. 20, actually the detection areas 8 are not in parallel with one another such that the interval between the centerlines (line segment ef) is widened rightward, because the distortion is generated in the oblique image A1 by a perspective effect such that the rectangular physical object is imaged in a trapezoid.

In the above embodiment, because the detection area 7 corresponding to each lead is set in order to specify the front-end position of the lead in the reference image A0, it is necessary to set the processing items to the number of leads.

Alternatively, the processing item, in which one long detection area is set in the y-axis direction so as to include the front end of each lead and the front end position of each lead is individually determined in the detection area, may be provided.

Figure 21:
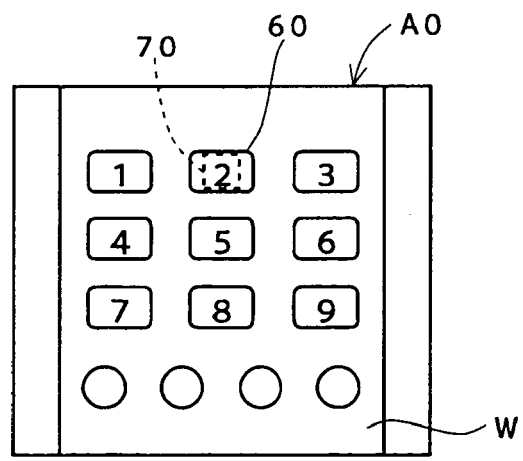
FIG. 21 shows an explanatory view of an example in which an inspection target region on an acceptable work is registered as a model.

The inspection target of the key height of a work, in which push-button character keys are arranged, will be described below. Prior to the inspection, as shown in FIG. 21, an area 70 including the character drawn in a key 60 is specified in each key 60 using the front image A0 which is obtained by taking the acceptable work W, and the image in the area 70 is registered as the model.

Figure 22:
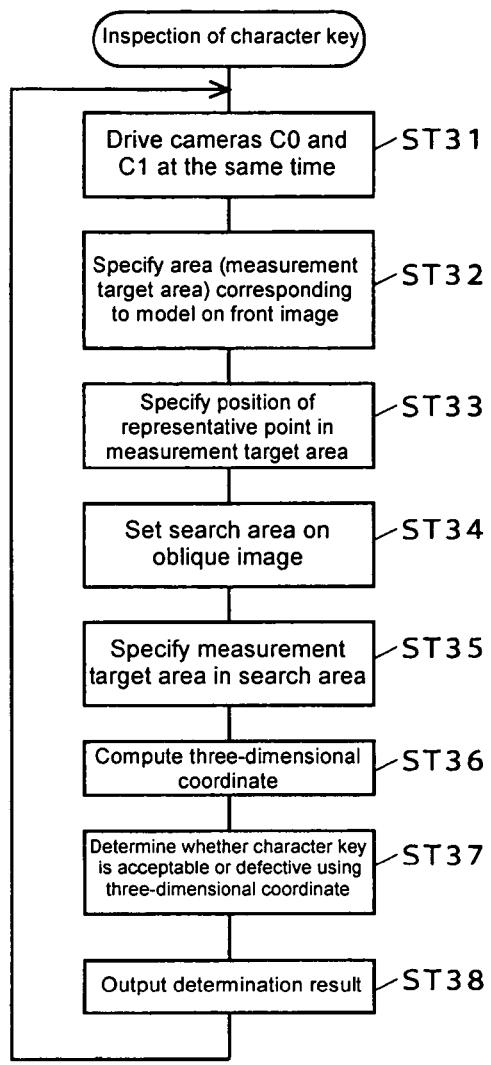
FIG. 22 shows a flowchart of a procedure of inspecting a character key.

FIG. 22 shows an inspection procedure. In ST31, the cameras C0 and C1 are simultaneously driven to generate the images. ST31 corresponds to the processing item of "stereo camera image input" in the processing item table 201. In ST32, the pattern matching process is performed to the front image A0 using the model registered before the inspection, an area which corresponds best to the model is specified, and the area is set at the measurement target area. Actually the process is performed in each model corresponding to each key 60. However, for the purpose of simplification, description is limited to only one key.

When the measurement target area is specified, the coordinate of the representative point (for example, the center point of the area) in the area is specified in ST33. The plural representative points (for example, points corresponding to plural feature points on the previously determined model) can also be specified. ST32 and ST33 correspond to the processing item of "high-accuracy ECM search" in the processing item table 201. After the processing item is performed, the processing item of "camera change" (not shown) is performed, and the flow goes to ST34.

In ST34, the search area is set on the oblique image A1 based on the coordinate of the representative point. Similarly to the case where the detection area 8 is set in the lead inspection, the homographic matrix $H_z$ is while the upper limit and lower limit of the previously specified height range are set at the height Z, the range where representative point exists possibly on the image A1 is determined by performing twice computations with the coordinate of the representative point and the upper limit and lower limit of the height range, and the area where the size of the model is added to the range is set at the search area.

In ST35, in the search area, the pattern matching process is performed with the model to specify the measurement target area and the position of the representative point in therein. In ST36, the three-dimensional coordinate is computed using the coordinates of the representative points in the measurement target areas of the front image A0 and oblique image A1. In ST37, it is determined whether or not the key height is proper by comparing the Z coordinate in the computed three-dimensional coordinate to a predetermined threshold. In ST38, the determination result is outputted to end the process. ST35 to ST38 correspond to the processing item of "stereo high-accuracy ECM search."

When the point corresponding to the feature point determined in the model is specified as the representative point on the reference image A0, similarly the corresponding point can be specified on the model in ST36. Alternatively, in St35, the model is converted into the shape which should be taken by the oblique camera C1 using the homographic matrix $H_z$ corresponding to a predetermined height (for example, height which becomes standard when the work is normal) in the specified height range, and the measurement target area may be specified using the post-conversion model.

Figure 23:
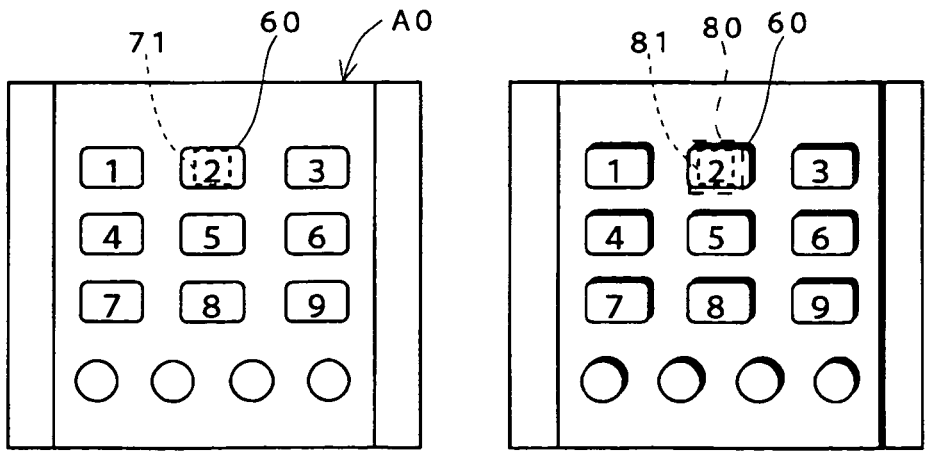
FIG. 23 shows an explanatory view of an example in which a measurement target area and a search area are set for an inspection target image.

FIG. 23 shows a measurement target area 71 specified with respect to the key 60 on the front image A0, a search area 80 on the side of the oblique image A1 set based on the position and size of the measurement target area 71, and a measurement target area 81 specified in the search area 80 through the above inspection.

In the procedure shown in FIG. 22, only the inspection is performed by the three-dimensional measurement process. However, the inspection of the character print state of each key and the like can also be performed by the two-dimensional measurement process with the front image A0.

Figure 24:
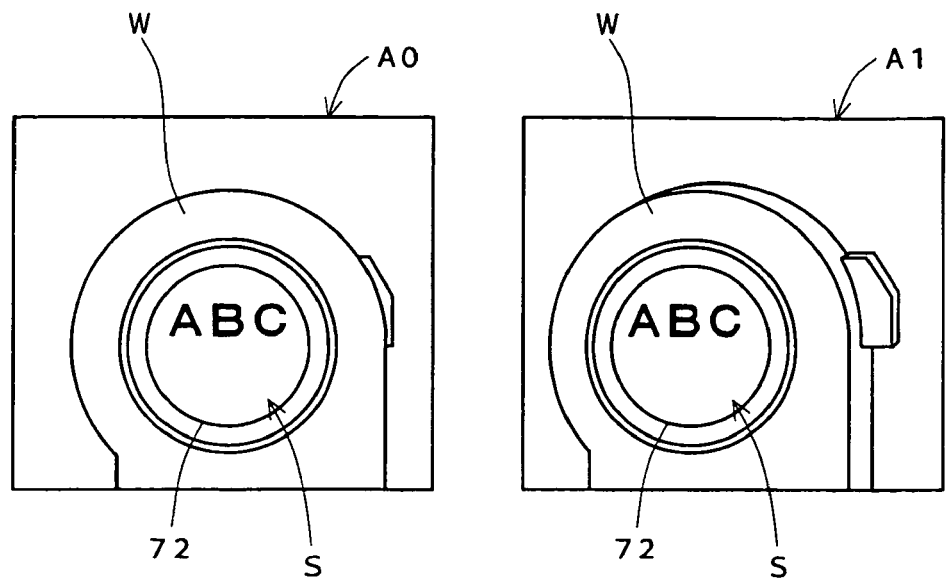
FIG. 24 shows an explanatory view of a front image and an oblique image of a work having a round display area.

In the next embodiment, for the work having a circular display area in the central portion, it is inspected whether or not the height in the display area is proper. FIG. 24 shows the images A0 and A1 of the work W, which are generated by the cameras C0 and C1. In FIG. 24, the sign S designates the display area of the inspection target. Similarly to the prior embodiment, the front image of the work W emerges in the front image A0, so that a borderline 72 of a display area S is formed in the circular shape. On the other hand, because the distortion is generated in the work W of the oblique image A1, the oblique image A1 differs from the front image A0 in the size of the display area S and the shape of the borderline 72, and The distortion is also generated in the character arrangement state in the display area S.

In the embodiment, prior to the inspection, the acceptable model of the work W is imaged, and a user is caused to specify a radius of the display area S and the measurement target area on the obtained front image A0. At this point, in the image processing unit 22, the process of determining the position of the center point of the display area S from the front image A0 is performed to register the relative position of the measurement target area with respect to the center point in the registry memory.

Figure 25:
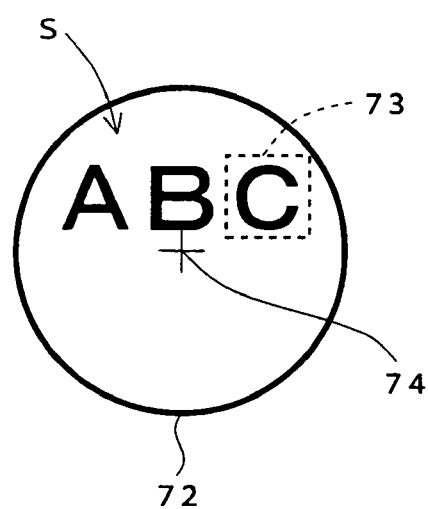
FIG. 25 shows an explanatory view of result in which the measurement target area is specified to the work.

FIG. 25 is an enlarged view showing the display area S in the front image A0. In FIG. 25, the numeral 73 designates the measurement target area specified by the user, and the numeral 74 designates the center point of the display area S. The process of extracting the circular pattern from the front image A0 is performed, and the borderline 72 which corresponds best to the circle (position correction model) having the size specified by the user is specified from the extraction result, which determines the position of the center point 74.

Figure 26:
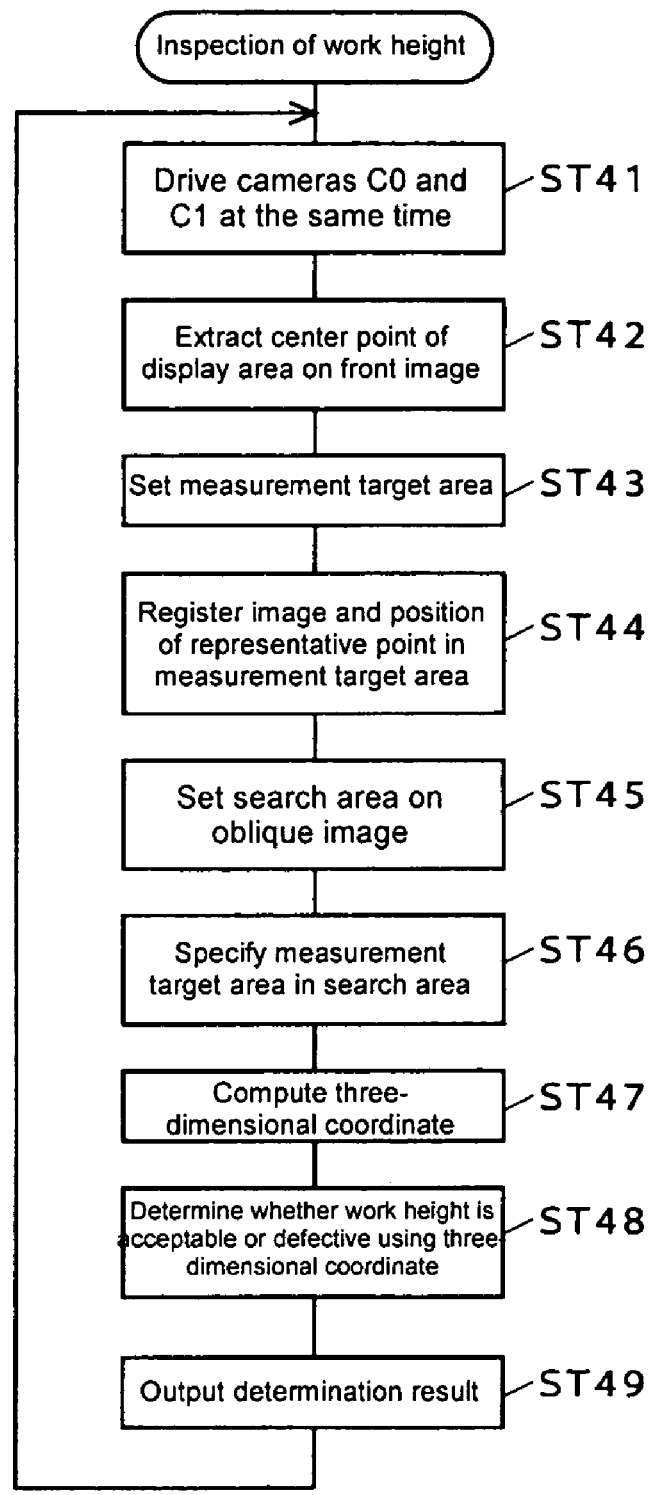
FIG. 26 shows a flowchart of a procedure when height inspection of the work of FIG. 16 is performed.

FIG. 26 shows the height inspection procedure for the work W of FIG. 24. In ST41, similarly to the prior embodiment, the cameras C0 and C1 are simultaneously driven to generate the front image A0 and the oblique image A1. ST41 corresponds to the processing item of "stereo camera image input" in the processing item table 201. In ST42, the position of the center point 74 of the display area S is determined from the front image A0 by the above process. ST42 corresponds to the processing item of "model position correction."

In ST43, the measurement target area 73 is set based on the previously registered relative position while the coordinate of the center point 74 determined in ST42 is set at a reference. In ST44, the image of the measurement target area 73 is registered as the search model image, and the position of the representative point (for example, the position of the center point in the area) in the measurement target area 73 is also registered. ST44 corresponds to the processing item of "stereo area setting." The processing item of "camera change" (not shown in FIG. 26) is performed after the processing item of FIG. 26.

In ST45, the search area 82 (shown in FIG. 27) is set on the oblique image A1. In the embodiment, similarly the coordinate of the representative point registered in ST44 is substituted in the formula (1), and the position and size of the search area 82 are determined by computing the formula (1) using the homographic matrix $H_z$ according to the upper limit and lower limit of the previously specified height range.

In ST46, a correlation matching process is performed in the search area 82 using the image registered in ST44 with respect to the measurement target area 73 of the front image A0. The area which is most similar to the registered image is specified, and the area is set at the measurement target area on the side of the oblique image A1. In ST47, the coordinate of the representative point is determined for the measurement target area on the side of the oblique image A1, and the three-dimensional coordinate is computed using the coordinate of the representative point on the side of the oblique image A1 and the coordinate of the representative point on the side of the front image A0. In ST48, it is determined whether or not the determined Z coordinate is proper. In ST49, the determination result is outputted to end the process. ST45 to ST49 correspond to the processing item of "stereo height measurement" in the processing item table 201.

Figure 27A:
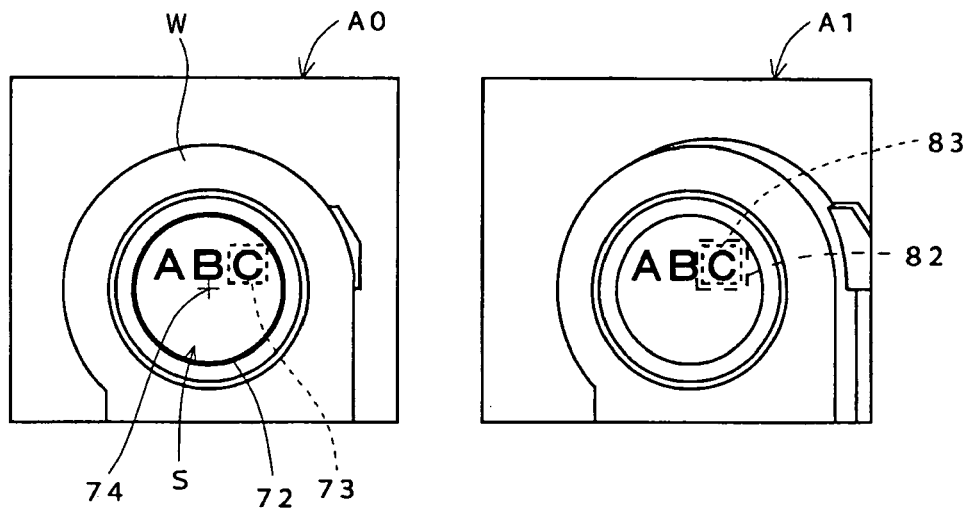
FIGS. 27A and 27B show explanatory views of an example in which the measurement target area and the search area follow a positional change of the work.
Figure 27B:
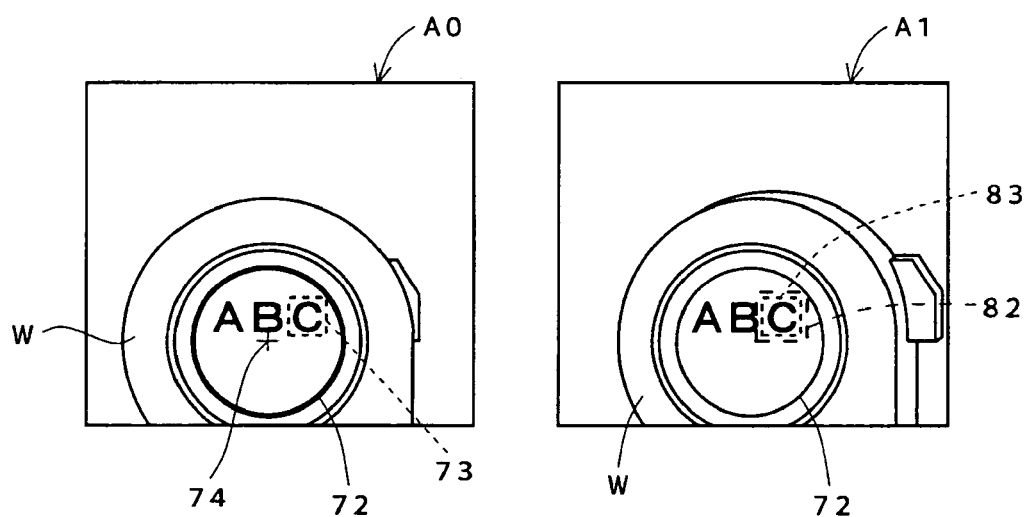

FIGS. 27A and 27B show the measurement target area 73 in the front image A0 and the search area 82 and measurement target area 83 in the oblique image A1 for each set of the front image A0 and oblique image A1. In the front image A0, the borderline 72 of the display area S is indicated by a wide line, and the determined position of the center point 74 of the display area S is also shown. FIG. 27A differs from FIG. 27B in the position of the work W. However, in both the cases, the measurement target area 73 is correctly set such that the target character is accommodated in the measurement target area 73.

According to the inspection procedure shown in FIG. 26, because the search model image is obtained from each work W of the inspection target, the three-dimensional measurement can be performed by applying the same sequence even if the surface patterns of the target characters of the three-dimensional measurement are different from one another. In this case, even if the works W is different from one another in the surface pattern, the position of the measurement target area is common in any work W while the shape of the work W is set at the reference, so that measurement target area can be set.

Alternatively, in the procedure of FIG. 26, the registered search model image is converted into the shape which should be imaged by the oblique camera C1 using the homographic matrix $H_z$, and the measurement target area 83 may be specified using the post-conversion image. The process of inspecting the character print state in the display area S with the front image A0 can also be incorporated in the procedure of FIG. 26.

What is claimed is:

1. An image processing apparatus which performs a process with a first image and a second image taken by a first camera and a second camera respectively, the first camera and the second camera being arranged so as to take a physical object from different directions, the image processing apparatus comprising:
sequence setting means for setting a sequence of a processing item; and
sequence executing means for executing the set sequence,
wherein the sequence setting means provides plural items of two-dimensional image processing and at least one item of a three-dimensional measurement process as the processing item which can be set at a sequence element by selection of a user,
the provided items of the two-dimensional image processing include at least one item of an on-first-image position specification process of specifying a position on a physical object in the first image, and
the three-dimensional measurement process includes an on-second-image position specification process of specifying a position on a physical object in the second image, the position on the physical object in the second image corresponding to the position on the physical object in the first image which is specified in the on-first-image position specification process belonging to the same sequence as the sequence to which the on-second-image position specification process belongs to.

2. An image processing apparatus according to claim 1, wherein the three-dimensional measurement process further includes a process of computing a three-dimensional coordinate using the position specified in the on-first-image position specification process and the position specified in the on-second-image position specification process.

3. An image processing apparatus according to claim 1, wherein a plurality of kinds of items of the on-first-image position specification process and a plurality of kinds of items of the three-dimensional measurement process are provided so as to be able to be set at the sequence element by the selection of a user.

4. An image processing apparatus according to claim 1, wherein a three-dimensional measurement basic sequence is provided so as to be able to be utilized by the selection of a user, the three-dimensional measurement basic sequence including at least one item of the on-first-image position specification process and at least one item of the three-dimensional measurement process.

5. An image processing apparatus according to claim 1, wherein a first detection area is set to the first image to detect an edge position in an edge detection direction, the edge position being determined for the first detection area, in at least one on-first-image position specification process to which the processing item is provided, and
a second detection area is set to the second image, a particularly direction being set at the edge detection direction in the second detection area, the particular direction being determined based on a positional relationship between the first camera and the second camera and the edge position specified in the on-first-image position specification process, in the on-second-image position specification process in at least one three-dimensional measurement process to which the processing item is provided.

6. An image processing apparatus according to claim 5, wherein, in the second detection area, a range along the edge detection direction is set based on a range along an optical axis of the first camera which is specified by a user as a three-dimensional measurement target range.

7. An image processing apparatus according to claim 5, wherein the first camera has a rectangular visual field range while arranged so as to take the physical object from a front side,
the second camera is located at a position which is separated from the visual field of the first camera in a longitudinal direction or in a crosswise direction, the second camera is arranged so as to take the physical object from an oblique direction with respect to the direction in which the physical object is seen from the front side,
the first detection area is set in the first image at a position based on a user command in on-first-image position specification process, and
the edge detection direction of the first detection area is located in a row of the first camera and the second camera.

8. An image processing apparatus according to claim 1, wherein a representative position of an area on the first image having a high degree of correspondence to a model image is specified in at least one on-first-image position specification process to which the processing item is provided, the model image being previously registered before the measurement is performed, and a representative position of an area on the second image having a high degree of correspondence to the model image is specified in the on-second-image position specification process in at least one three-dimensional measurement process to which the processing item is provided.

9. An image processing apparatus according to claim 8, wherein, in the on-second-image position specification process, a search area is set on the second image based on the positional relationship between the first camera and the second camera and the representative positions specified in the on-first-image position specification process, and the representative position of the area having the high degree of correspondence to the model image is specified in the search area.

10. An image processing apparatus according to claim 9, wherein the search area is set based on the range along the optical axis of the first camera specified by a user as the three-dimensional measurement target range.

11. An image processing apparatus according to claim 1, wherein a representative position of a measurement target area set on the first image based on the user command is specified to obtain the image in the measurement target area as the model image in at least one on-first-image position specification process to which the processing item is provided, and a representative position of an area on the second image having a high degree of correspondence to the model image is specified in the on-second-image position specification process in at least one three-dimensional measurement process to which the processing item is provided.

12. An image processing apparatus according to claim 11, wherein, in the on-second-image position specification process, a search area is set on the second image based on the positional relationship between the first camera and the second camera and the representative positions specified in the on-first-image position specification process, and the representative position of the area having the high degree of correspondence to the model image is specified in the search area.

13. An image processing apparatus according to claim 11, wherein the search area is set based on the range along the optical axis of the first camera specified by a user as the three-dimensional measurement target range.

14. An image processing method in which a first image and a second image respectively taken by a first camera and a second camera are used, the first camera and the second camera being arranged so as to take a physical object from different directions, the image processing method comprising:

a sequence setting step of setting a sequence of a processing item; and a sequence executing step of executing the set sequence, wherein the sequence setting step provides plural items of two-dimensional image processing and at least one item of a three-dimensional measurement process as the processing item which can be set at a sequence element by selection of a user, the provided items of the two-dimensional image processing include at least one item of an on-first-image position specification process of specifying a position on a physical object in the first image, and the three-dimensional measurement process includes an on-second-image position specification process of specifying a position on a physical object in the second image, the position on the physical object in the second image corresponding to the position on the physical object in the first image which is specified in the on-first-image position specification process belonging to the same sequence as the sequence to which the on-second-image position specification process belongs to.

15. An image processing method according to claim 14, wherein the three-dimensional measurement process further includes a process of computing a three-dimensional coordinate using the position specified in the on-first-image position specification process and the position specified in the second on-image position specification process.

16. An image processing apparatus which performs a process with a first image and a second image taken by a first camera and a second camera respectively, the first camera having a rectangular visual field range while arranged so as to take a physical object from a front side, the second camera being located at a position which is separated from the visual field of the first camera in a longitudinal direction or in a crosswise direction, the second camera being arranged so as to take the physical object from an oblique direction with respect to the direction in which the physical object is seen from the front side, the image processing apparatus comprising:

on-first-image position specification means for specifying a position on the physical object in the first image;

on-second-image position specification means for specifying a position on the physical object in the second image, the position on the physical object in the second image corresponding to the position on the physical object in the first image specified by the on-first-image position specification means; and three-dimensional coordinate computation means for computing a three-dimensional coordinate using the position specified by the on-first-image position specification means and the position specified by the on-second-image position specification means, wherein the on-first-image position specification means sets a first detection area at a position in the first image based on a user command, the on-first-image position specification means specifies an edge position in an edge detection direction determined for the first detection area, and the edge detection direction of the first detection area is located in a row of the first camera and the second camera, and the on-second-image position specification means sets a second detection area to the second image, a particular direction is set at the edge detection direction in the second detection area, the particular direction being determined based on a positional relationship between the first camera and the second camera and the edge position specified in the on-first-image position specification means, and the on-second-image position specification means specifies the edge position in the edge detection direction in the second detection area.

17. An image processing method in which a process is performed with a first image and a second image taken by a first camera and a second camera respectively, the first camera having a rectangular visual field range while arranged so as to take a physical object from a front side, the second camera being located at a position which is separated from the visual field of the first camera in a longitudinal direction or in a crosswise direction, the second camera being arranged so as to take the physical object from an oblique direction with respect to the direction in which the physical object is seen from the front side, the image processing method comprising:

an on-first-image position specification step of specifying a position on the physical object in the first image;

an on-second-image position specification step of specifying a position on the physical object in the second image, the position on the physical object in the second image corresponding to the position on the physical object in the first image specified by the on-first-image position specification step; and a three-dimensional coordinate computation step of computing a three-dimensional coordinate using the position specified by the on-first-image position specification step and the position specified by the on-second-image position specification step, wherein the on-first-image position specification step sets a first detection area at a position in the first image based on a user command, the on-first-image position specification step specifies an edge position in an edge detection direction determined for the first detection area, and the edge detection direction of the first detection area is located in a row of the first camera and the second camera, and the on-second-image position specification step sets a second detection area to the second image, a particular direction is set at the edge detection direction in the second detection area, the particular direction being determined based on a positional relationship between the first camera and the second camera and the edge position specified in the on-first-image position specification step, and the on-second-image position specification step specifies the edge position in the edge detection direction in the second detection area.

* * * * *